(12) United States Patent
Zhao et al.

(10) Patent No.: US 9,716,531 B2
(45) Date of Patent: Jul. 25, 2017

(54) NEAR FIELD COMMUNICATION-BASED DATA TRANSMISSION METHOD AND APPARATUS, AND NEAR FIELD COMMUNICATION DEVICE

(71) Applicant: Huawei Device Co., Ltd., Shenzhen (CN)

(72) Inventors: Xiaona Zhao, Beijing (CN); Xinmiao Chang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/984,059

(22) Filed: Dec. 30, 2015

(65) Prior Publication Data

US 2016/0112096 A1   Apr. 21, 2016

Related U.S. Application Data

(63) Continuation of application No. PCT/CN2014/083792, filed on Aug. 6, 2014.

(30) Foreign Application Priority Data

Aug. 29, 2013   (CN) .......................... 2013 1 0385178

(51) Int. Cl.
*H04B 5/00* (2006.01)
*G06F 3/0488* (2013.01)
(Continued)

(52) U.S. Cl.
CPC ....... *H04B 5/0031* (2013.01); *G06F 3/03545* (2013.01); *G06F 3/0488* (2013.01);
(Continued)

(58) Field of Classification Search
CPC .. G06F 3/03545; G06F 3/0489; H04W 4/008; H04B 5/0031
See application file for complete search history.

(56) References Cited

U.S. PATENT DOCUMENTS

| 6,563,494 B1 | 5/2003 | Eichstaedt et al. |
| 2003/0038790 A1 | 2/2003 | Koyama et al. |

(Continued)

FOREIGN PATENT DOCUMENTS

| CN | 1466712 A | 1/2004 |
| CN | 102419689 A | 4/2012 |

(Continued)

OTHER PUBLICATIONS

Foreign Communication From a Counterpart Application, European Application No. 14841271.1, Extended European Search Report dated Jun. 2, 2016, 13 pages.

(Continued)

*Primary Examiner* — Tuan Pham
(74) *Attorney, Agent, or Firm* — Conley Rose, P.C.

(57) ABSTRACT

A near field communication (NFC)-based data transmission method and apparatus, and a near field communication device. An NFC touch apparatus sends an intelligent extraction instruction to a first NFC device, to trigger the first NFC device to perform intelligent extraction processing on to-be-transmitted data determined by the first NFC device to obtain intelligently extracted data, receives the intelligently extracted data that is sent by the first NFC device by means of NFC communication and sends the intelligently extracted data to a second NFC device by means of NFC communication. A size of the NFC touch apparatus is smaller than sizes of the first NFC device and the second NFC device, so that an NFC antenna of the NFC touch apparatus and an NFC antenna of the first NFC device as well as an NFC antenna of the second NFC device are easily within an effective communication range.

19 Claims, 10 Drawing Sheets

An NFC touch apparatus sends an intelligent extraction instruction to a first NFC device, to trigger the first NFC device to perform intelligent extraction processing on to-be-transmitted data determined by the first NFC device to obtain intelligently extracted data — 101

The NFC touch apparatus receives the intelligently extracted data that is sent by the first NFC device by means of NFC communication — 102

The NFC touch apparatus sends the intelligently extracted data to a second NFC device by means of NFC communication, where a size of the NFC touch apparatus is smaller than sizes of the first NFC device and the second NFC device — 103

(51) Int. Cl.
*H04W 4/00* (2009.01)
*G06F 3/0354* (2013.01)
*H04L 29/08* (2006.01)

(52) U.S. Cl.
CPC ............. *H04L 67/28* (2013.01); *H04W 4/008* (2013.01); *G06F 2203/0384* (2013.01)

(56) References Cited

U.S. PATENT DOCUMENTS

| | | | |
|---|---|---|---|
| 2005/0220060 | A1 | 10/2005 | Takusagawa et al. |
| 2013/0091238 | A1* | 4/2013 | Liu ................... H04W 76/02 709/217 |
| 2013/0203346 | A1 | 8/2013 | Han |
| 2013/0203353 | A1 | 8/2013 | Kim et al. |
| 2013/0238744 | A1* | 9/2013 | Paschke ............... G06F 9/543 709/216 |
| 2014/0004793 | A1* | 1/2014 | Bandyopadhyay ... H04W 4/008 455/41.1 |
| 2014/0253470 | A1* | 9/2014 | Havilio ................ G06F 3/0412 345/173 |
| 2014/0256250 | A1* | 9/2014 | Cueto ................. H04B 5/0031 455/41.1 |
| 2014/0292720 | A1 | 10/2014 | Liang |
| 2015/0092663 | A1 | 4/2015 | Cho et al. |
| 2015/0149347 | A1 | 5/2015 | Liu |

FOREIGN PATENT DOCUMENTS

| | | |
|---|---|---|
| CN | 102523346 A | 6/2012 |
| CN | 102736752 A | 10/2012 |
| CN | 102771064 A | 11/2012 |
| CN | 202916872 U | 5/2013 |
| CN | 103176933 A | 6/2013 |
| CN | 103246439 A | 8/2013 |
| JP | 2010081300 A | 4/2010 |
| JP | 2010191993 A | 9/2010 |
| JP | 2013162515 A | 8/2013 |
| KR | 101433608 B1 | 8/2014 |

OTHER PUBLICATIONS

Partial English Translation and Abstract of Chinese Patent Application No. CN202916872, Apr. 2, 2016, 4 pages.
Foreign Communication From a Counterpart Application, Chinese Application No. 201310385178.8, Chinese Office Action dated Mar. 10, 2016, 15 pages.
Foreign Communication From a Counterpart Application, PCT Application No. PCT/CN2014/083792, English Translation of International Search Report dated Nov. 14, 2014, 2 pages.
Foreign Communication From a Counterpart Application, PCT Application No. PCT/CN2014/083792, English Translation of Written Opinion dated Nov. 14, 2014, 12 pages.
Foreign Communication From a Counterpart Application, Chinese Application No. 201310385178.8, Chinese Office Action dated Oct. 11, 2016, 11 pages.
Foreign Communication From A Counterpart Application, Japanese Application No. JP2016-524679, Japanese Office Action dated Feb. 28, 2017, 4 pages.
Foreign Communication From A Counterpart Application, Japanese Application No. JP2016-524679, English Translation of Japanese Office Action dated Feb. 28, 2017, 4 pages.

* cited by examiner

NEAR FIELD COMMUNICATION-BASED DATA TRANSMISSION METHOD AND APPARATUS, AND NEAR FIELD COMMUNICATION DEVICE

CROSS-REFERENCE TO RELATED APPLICATIONS

This application is a continuation of International Application No. PCT/CN2014/083792, filed on Aug. 6, 2014, which claims priority to Chinese Patent Application No. 201310385178.8, filed on Aug. 29, 2013, both of which are hereby incorporated by reference in their entireties.

TECHNICAL FIELD

Embodiments of the present disclosure relate to the communications field, and in particular, to a near field communication-based data transmission method and apparatus, and a near field communication device.

BACKGROUND

Near field communication (NFC) is a short-distance wireless connection technology based on radio frequency identification (RFID), and works at a frequency of 13.56 megahertz (MHZ). Currently, four transmission rates: 106 kilobits per second (Kbit/s), 212 Kbit/s, 424 Kbit/s, and 848 Kbit/s are supported, and an effective communication range is 0-20 centimeters (cm), where a typical value is 4 cm.

Due to a simple operation and a relatively low data transmission rate of NFC, NFC is relatively suitable for transmission of a small amount of data. For example, by using the NFC technology, a contact card or contact information is shared, a webpage is shared, and BLUETOOTH or Wi-Fi pairing is completed. Generally, two devices having an NFC function (which are called NFC devices for short below) perform NFC communication in a back-to-back manner. For example, a user A opens an address book of a mobile phone of the user A to select a contact and then uses the mobile phone to touch or approach a mobile phone of a user B, and a contact page on a screen of the mobile phone immediately shrinks; in this case, information about the contact can be transferred from the user A to the user B only by simply touching the screen.

However, with the diversification of near field communication devices such as mobile phones, tablet computers, and even various household appliances, sizes of NFC devices gradually become different. Moreover, a user may not know a specific area of an NFC antenna of an NFC device clearly, and an effective NFC communication range is limited. Therefore, in a process of placing two NFC devices back to back, a user may need to try many times before basically aligning NFC antennas of the two NFC devices successfully, which leads to a reduction in a success rate of NFC communication. In addition, such a back-to-back transmission manner brings an uncomfortable feeling to a user, and therefore user experience is greatly degraded.

SUMMARY

Embodiments of the present disclosure provide a near field communication-based data transmission method and apparatus, and a near field communication device, which can implement quick near field communication with a high success rate.

According to a first aspect, an embodiment of the present disclosure provides a near field communication-based data transmission method, including sending, by an NFC touch apparatus, an intelligent extraction instruction to a first NFC device, to trigger the first NFC device to perform intelligent extraction processing on to-be-transmitted data determined by the first NFC device to obtain intelligently extracted data; receiving, by the NFC touch apparatus, the intelligently extracted data that is sent by the first NFC device by means of NFC communication; and sending, by the NFC touch apparatus, the intelligently extracted data to a second NFC device by means of NFC communication, where a size of the NFC touch apparatus is smaller than sizes of the first NFC device and the second NFC device.

In a first possible implementation manner of the first aspect, the to-be-transmitted data determined by the first NFC device includes data selected by the NFC touch apparatus on a touchscreen of the first NFC device; or data currently displayed on the first NFC device.

With reference to the first aspect or the first possible implementation manner of the first aspect, in a second possible implementation manner of the first aspect, the sending, by an NFC touch apparatus, an intelligent extraction instruction to a first NFC device, to trigger the first NFC device to perform intelligent extraction processing on to-be-transmitted data determined by the first NFC device to obtain intelligently extracted data includes sending, by the NFC touch apparatus, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or sending, by the NFC touch apparatus, the intelligent extraction instruction to the first NFC device by means of NFC communication, to trigger the first NFC device to perform intelligent extraction processing on the to-be-transmitted data determined by the first NFC device to obtain the intelligently extracted data.

With reference to the first aspect or the first possible implementation manner of the first aspect, in a third possible implementation manner of the first aspect, the sending, by an NFC touch apparatus, an intelligent extraction instruction to a first NFC device, to trigger the first NFC device to perform intelligent extraction processing on to-be-transmitted data determined by the first NFC device to obtain intelligently extracted data includes sending, by the NFC touch apparatus after the first NFC device determines the to-be-transmitted data and when the NFC touch apparatus and the first NFC device are not within an NFC communication range, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or sending, by the NFC touch apparatus after the first NFC device determines the to-be-transmitted data and when the NFC touch apparatus and the first NFC device are within an NFC communication range, the intelligent extraction instruction to the first NFC device by means of NFC communication, to trigger the first NFC device to perform intelligent extraction processing on the to-be-transmitted data determined by the first NFC device to obtain the intelligently extracted data.

With reference to the first possible implementation manner of the first aspect, in a fourth possible implementation manner of the first aspect, if the to-be-transmitted data determined by the first NFC device is the data selected by the NFC touch apparatus on the touchscreen of the first NFC device, the sending, by an NFC touch apparatus, an intelligent extraction instruction to a first NFC device, to trigger the first NFC device to perform intelligent extraction processing on to-be-transmitted data determined by the first NFC device to obtain intelligently extracted data includes sending, by the NFC touch apparatus before selecting the to-be-transmitted data, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or sending, by the NFC touch apparatus when selecting the to-be-transmitted data, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data.

With reference to the first aspect or any one of the first to fourth possible implementation manners of the first aspect, in a fifth possible implementation manner of the first aspect, the NFC touch apparatus works in a card emulation mode, a reader/writer mode, or a peer to peer mode.

According to a second aspect, an embodiment of the present disclosure provides a near field communication NFC-based data transmission method, including receiving, by a first NFC device, an intelligent extraction instruction sent by an NFC touch apparatus; intelligently extracting, by the first NFC device after receiving the intelligent extraction instruction, determined to-be-transmitted data to obtain intelligently extracted data; and sending, by the first NFC device, the intelligently extracted data to the NFC touch apparatus by means of NFC communication, so that the NFC touch apparatus sends the intelligently extracted data to a second NFC device after receiving the intelligently extracted data.

In a first possible implementation manner of the second aspect, the first NFC device works in a card emulation mode, a reader/writer mode, or a peer to peer mode.

With reference to the second aspect or the first possible implementation manner of the second aspect, in a second possible implementation manner of the second aspect, the intelligently extracting, by the first NFC device after receiving the intelligent extraction instruction, determined to-be-transmitted data to obtain intelligently extracted data includes intelligently extracting, by the first NFC device after receiving the intelligent extraction instruction, the to-be-transmitted data according to a type of the to-be-transmitted data to obtain the intelligently extracted data.

With reference to the second possible implementation manner of the second aspect, in a third possible implementation manner of the second aspect, the intelligently extracting, by the first NFC device after receiving the intelligent extraction instruction, the to-be-transmitted data according to a type of the to-be-transmitted data to obtain the intelligently extracted data includes, if the type of the to-be-transmitted data is a resource file, extracting, by the first NFC device, wireless connection configuration information of the first NFC device to obtain the intelligently extracted data; or extracting, by the first NFC device, wireless connection configuration information of the first NFC device and attribute information of the resource file to obtain the intelligently extracted data.

With reference to the second possible implementation manner of the second aspect, in a fourth possible implementation manner of the second aspect, the intelligently extracting, by the first NFC device after receiving the intelligent extraction instruction, the to-be-transmitted data according to a type of the to-be-transmitted data to obtain the intelligently extracted data includes, if the type of the to-be-transmitted data is contact information, extracting, by the first NFC device, the contact information to obtain the intelligently extracted data; or extracting, by the first NFC device, the contact information and operation instruction information corresponding to the contact information to obtain the intelligently extracted data.

With reference to the second possible implementation manner of the second aspect, in a fifth possible implementation manner of the second aspect, the intelligently extracting, by the first NFC device after receiving the intelligent extraction instruction, the to-be-transmitted data according to a type of the to-be-transmitted data to obtain the intelligently extracted data includes, if the type of the to-be-transmitted data is network information, extracting, by the first NFC device, at least one or a combination of website information of the network information, text information corresponding to the network information, and operation instruction information corresponding to the network information to obtain the intelligently extracted data.

With reference to the second aspect or the first possible implementation manner of the second aspect, in a sixth possible implementation manner of the second aspect, the intelligently extracting, by the first NFC device after receiving the intelligent extraction instruction, determined to-be-transmitted data to obtain intelligently extracted data includes intelligently extracting, by the first NFC device after receiving the intelligent extraction instruction, the to-be-transmitted data according to a size of the to-be-transmitted data to obtain the intelligently extracted data.

With reference to the sixth possible implementation manner of the second aspect, in a seventh possible implementation manner of the second aspect, the intelligently extracting, by the first NFC device after receiving the intelligent extraction instruction, the to-be-transmitted data according to a size of the to-be-transmitted data to obtain the intelligently extracted data includes, if the size of the to-be-transmitted data is greater than or equal to a preset length threshold, extracting, by the first NFC device, wireless connection configuration information of the first NFC device to obtain the intelligently extracted data; or extracting, by the first NFC device, wireless connection configuration information of the first NFC device and attribute information of the resource file to obtain the intelligently extracted data.

With reference to the sixth possible implementation manner of the second aspect, in an eighth possible implementation manner of the second aspect, the intelligently extracting, by the first NFC device after receiving the intelligent extraction instruction, the to-be-transmitted data according to a size of the to-be-transmitted data to obtain the intelligently extracted data includes, if the size of the to-be-transmitted data is less than a preset length threshold, extracting, by the first NFC device, the to-be-transmitted data to obtain the intelligently extracted data; or extracting, by the first NFC device, the to-be-transmitted data and operation instruction information corresponding to the to-be-transmitted data to obtain the intelligently extracted data.

With reference to the third or seventh possible implementation manner of the second aspect, in a ninth possible implementation manner of the second aspect, the wireless connection configuration information includes BLUETOOTH configuration information and/or WiFi configuration information.

According to a third aspect, an embodiment of the present disclosure provides an NFC touch apparatus, including a first sending module configured to send an intelligent extraction instruction to a first NFC device, to trigger the first NFC device to perform intelligent extraction processing on to-be-transmitted data determined by the first NFC device to obtain intelligently extracted data; a receiving module configured to receive the intelligently extracted data that is sent by the first NFC device by means of NFC communication; and a second sending module configured to send the intelligently extracted data to the second NFC device by means of NFC communication, where a size of the NFC touch apparatus is smaller than sizes of the first NFC device and the second NFC device.

In a first possible implementation manner of the third aspect, the NFC touch apparatus further includes a selecting module; and the to-be-transmitted data determined by the first NFC device includes data selected by the selecting module on a touchscreen of the first NFC device; or the to-be-transmitted data determined by the first NFC device includes data currently displayed on the first NFC device.

With reference to the third aspect or the first possible implementation manner of the third aspect, in a second possible implementation manner of the third aspect, the first sending module is configured to send the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or the first sending module is configured to send the intelligent extraction instruction to the first NFC device by means of NFC communication, to trigger the first NFC device to perform intelligent extraction processing on the to-be-transmitted data determined by the first NFC device to obtain the intelligently extracted data.

With reference to the third aspect or the first possible implementation manner of the third aspect, in a third possible implementation manner of the third aspect, the first sending module is configured to send, after the first NFC device determines the to-be-transmitted data and when the NFC touch apparatus and the first NFC device are not within an NFC communication range, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or the first sending module is configured to send, after the first NFC device determines the to-be-transmitted data and when the NFC touch apparatus and the first NFC device are within an NFC communication range, the intelligent extraction instruction to the first NFC device by means of NFC communication, to trigger the first NFC device to perform intelligent extraction processing on the to-be-transmitted data determined by the first NFC device to obtain the intelligently extracted data.

With reference to the first possible implementation manner of the third aspect, in a fourth possible implementation manner of the third aspect, if the to-be-transmitted data is the data selected by the selecting module on the touchscreen of the first NFC device, the first sending module is configured to send, before the selecting module selects the to-be-transmitted data, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or the first sending module is configured to send, when the selecting module selects the to-be-transmitted data, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data.

With reference to the third aspect or any one of the first to fourth possible implementation manners of the third aspect, in a fifth possible implementation manner of the third aspect, the NFC touch apparatus works in a card emulation mode, a reader/writer mode, or a peer to peer mode.

According to a fourth aspect, an embodiment of the present disclosure provides a near field communication NFC device, including a receiving module configured to receive an intelligent extraction instruction sent by an NFC touch apparatus; a processing module configured to intelligently extract, after the receiving module receives the intelligent extraction instruction, determined to-be-transmitted data to obtain intelligently extracted data; and a sending module configured to send the intelligently extracted data to the NFC touch apparatus by means of NFC communication, so that the NFC touch apparatus sends the intelligently extracted data to a second NFC device after receiving the intelligently extracted data.

In a first possible implementation manner of the fourth aspect, the processing module includes a first processing unit configured to intelligently extract, after the intelligent extraction instruction is received, the to-be-transmitted data according to a type of the to-be-transmitted data to obtain the intelligently extracted data.

With reference to the first possible implementation manner of the fourth aspect, in a second possible implementation manner of the fourth aspect, the first processing unit is configured to, if the type of the to-be-transmitted data is a resource file, extract wireless connection configuration information of the first NFC device to obtain the intelligently extracted data; or extract wireless connection configuration information of the first NFC device and attribute information of the resource file to obtain the intelligently extracted data.

With reference to the first possible implementation manner of the fourth aspect, in a third possible implementation manner of the fourth aspect, the first processing unit is configured to, if the type of the to-be-transmitted data is contact information, extract the contact information to obtain the intelligently extracted data; or extract the contact information and operation instruction information corresponding to the contact information to obtain the intelligently extracted data.

With reference to the first possible implementation manner of the fourth aspect, in a fourth possible implementation manner of the fourth aspect, the first processing unit is configured to, if the type of the to-be-transmitted data is network information, extract at least one or a combination of website information of the network information, text information corresponding to the network information, and operation instruction information corresponding to the network information to obtain the intelligently extracted data.

With reference to the fourth aspect, in a fifth possible implementation manner of the fourth aspect, the processing module includes a second processing unit configured to intelligently extract, after the intelligent extraction instruction is received, the to-be-transmitted data according to a size of the to-be-transmitted data to obtain the intelligently extracted data.

With reference to the fifth possible implementation manner of the fourth aspect, in a sixth possible implementation manner of the fourth aspect, the second processing unit is configured to, if the size of the to-be-transmitted data is greater than or equal to a preset length threshold, extract a wireless connection configuration information to obtain the intelligently extracted data; or extract wireless connection configuration information and attribute information of the resource file to obtain the intelligently extracted data.

With reference to the sixth possible implementation manner of the fourth aspect, in a seventh possible implementation manner of the fourth aspect, the second processing unit is configured to, if the size of the to-be-transmitted data is less than a preset length threshold, extract the to-be-transmitted data to obtain the intelligently extracted data; or extract the to-be-transmitted data and operation instruction information corresponding to the to-be-transmitted data to obtain the intelligently extracted data.

With reference to the second or sixth possible implementation manner of the fourth aspect, in an eighth possible implementation manner of the fourth aspect, the wireless connection configuration information includes BLUETOOTH configuration information and/or WiFi configuration information.

According to the field communication-based data transmission method and apparatus, and the near field communication device that are provided in the embodiments of the present disclosure, an NFC touch apparatus approaches or touches a first NFC device and a second NFC device successively, so as to complete data transmission first from the first NFC device to the NFC touch apparatus and then from the NFC touch apparatus to the second NFC device, and finally, data transmission and information sharing between the first NFC device and the second NFC device are implemented. In the transmission process, because a size of the NFC touch apparatus is smaller than sizes of the first NFC device and the second NFC device, an NFC antenna of the NFC touch apparatus and an NFC antenna of the first NFC device as well as an NFC antenna of the second NFC device are easily within an effective communication range, which effectively reduces a probability of unsuccessful communication caused because sizes of NFC devices may be different and a user may not know a specific area of an NFC antenna clearly, and avoids problems of poor user experience and an uncomfortable feeling that are brought by a back-to-back communication manner of two NFC devices. In addition, compared with a case in which two NFC devices directly perform data transmission in the prior art, the two NFC devices must approach each other, and data transmission can be performed only when the two are within an effective NFC communication range, while in the embodiments, by using the NFC touch apparatus, there is no time or distance limitation on data transmission between the first NFC device and the second NFC device any longer.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure relate to NFC devices and an NFC touch apparatus. An NFC device refers to any device having an NFC function, such as an NFC tag, a conference terminal, a personal computer (PC), a personal digital assistant (PDA), a smartphone, a smart television, a home theater personal computer (HTPC), or a digital conference desktop intelligent device.

The NFC touch apparatus in the embodiments of the present disclosure refers to any device having an NFC function, such as a stylus, a touch pen, or an NFC tag. Sizes of the NFC devices and the NFC touch apparatus are relative concepts. As a transit transmission apparatus, the NFC touch apparatus is preferably a small-sized device. For clear description, an NFC device providing to-be-transmitted data is referred to as a first NFC device below, and an NFC device receiving to-be-transmitted data by using the NFC touch apparatus is referred to as a second NFC device.

It should be noted that in the embodiments of the present disclosure, the first NFC device and the second NFC device are merely two relative concepts and are not strictly divided by a boundary, and in an actual use process, an NFC device may be used as the first NFC device or the second NFC device according a requirement.

Figure 1:
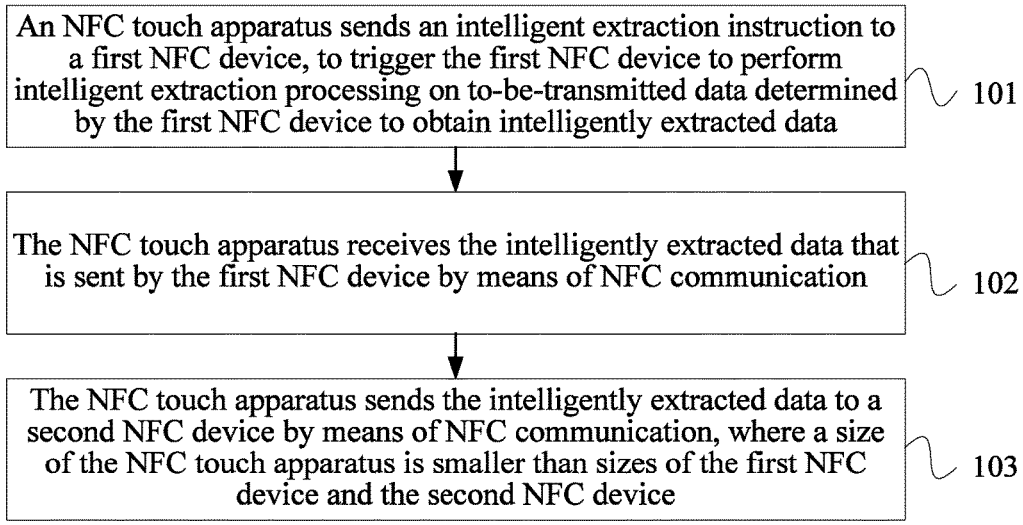
FIG. 1 is a flowchart of Embodiment 1 of a near field communication-based data transmission method according to the present disclosure.

FIG. 1 is a flowchart of Embodiment 1 of a near field communication-based data transmission method according to the present disclosure. This embodiment is applicable to a scenario in which there are at least two NFC devices and an NFC touch apparatus in a near field communication NFC system. The NFC touch apparatus may be disposed independently, or may be used as an auxiliary device of a first or second NFC device and may be accommodated in specified space of the first or second NFC device, or may be integrated in a third device, where the third device may be an NFC device or may be another device that is provided with an NFC touch apparatus and that can be carried or used easily, for example, a BLUETOOTH headset provided with an NFC touch apparatus. This embodiment is executed by an NFC touch apparatus. This embodiment may include the following steps.

101: The NFC touch apparatus sends an intelligent extraction instruction to a first NFC device, to trigger the first NFC device to perform intelligent extraction processing on to-be-transmitted data determined by the first NFC device to obtain intelligently extracted data.

In this step, for the to-be-transmitted data determined by the first NFC device, the NFC touch apparatus sends the intelligent extraction instruction to the first NFC device, to trigger the first NFC device to perform intelligent extraction processing on the to-be-transmitted data determined by the first NFC device to obtain the intelligently extracted data. The intelligent extraction processing refers to a process of performing related intelligent processing by the first NFC device on the to-be-transmitted data according to a type, a size, or the like of the to-be-transmitted data. For example, if to-be-transmitted data is a name and a telephone number in contact information, after receiving an intelligent extraction instruction, the first NFC device extracts only the name and the telephone number in the contact information as intelligently extracted data, or also extracts corresponding operation instruction information, such as automatically adding to an address book, together with the name and the telephone number in the contact information as intelligently extracted data.

Optionally, the to-be-transmitted data determined by the first NFC device includes data selected by the NFC touch apparatus on a touchscreen of the first NFC device, or data currently displayed on the first NFC device.

To-be-transmitted data may be selected on the touchscreen of the first NFC device by using the NFC touch apparatus, for example, the NFC touch apparatus selects to-be-transmitted data on the touchscreen of the first NFC device by using an action instruction such as performing selection with a circle, writing a text, or taping, so that the first NFC device determines the to-be-transmitted data according to the action instruction; or the NFC touch apparatus does not need to perform selection on the touchscreen of the first NFC device, and data currently displayed on the first NFC device is used as to-be-transmitted data instead, for example, all data displayed on a current page that is opened by a user in a manner such as touching with a finger or performing a key-pressing operation is used as to-be-transmitted data determined by the first NFC device.

102: The NFC touch apparatus receives the intelligently extracted data that is sent by the first NFC device by means of NFC communication.

When the NFC touch apparatus and the first NFC device are within an effective communication range, the first NFC device sends, to the NFC touch apparatus by means of NFC communication, the intelligently extracted data that is obtained by the first NFC device by performing intelligent extraction processing.

103: The NFC touch apparatus sends the intelligently extracted data to a second NFC device by means of NFC communication, where a size of the NFC touch apparatus is smaller than sizes of the first NFC device and the second NFC device.

When the NFC touch apparatus and the second NFC device are within the effective communication range, the NFC touch apparatus sends the intelligently extracted data to the second NFC device by means of NFC communication.

According to the near field communication NFC-based data transmission method provided in this embodiment of the present disclosure, an NFC touch apparatus approaches or touches a first NFC device and a second NFC device successively, so as to complete data transmission first from the first NFC device to the NFC touch apparatus and then from the NFC touch apparatus to the second NFC device, and finally, data transmission and information sharing between the first NFC device and the second NFC device are implemented. In the transmission process, because a size of the NFC touch apparatus is smaller than sizes of the first NFC device and the second NFC device, an NFC antenna of the NFC touch apparatus and an NFC antenna of the first NFC device as well as an NFC antenna of the second NFC device are easily within an effective communication range, which effectively reduces a probability of unsuccessful communication caused because sizes of NFC devices may be different and a user may not know a specific area of an NFC antenna clearly, and avoids problems of poor user experience and an uncomfortable feeling that are brought by a back-to-back communication manner of two NFC devices. In addition, compared with a case in which two NFC devices directly perform data transmission in the prior art, the two NFC devices must approach each other, and data transmission can be performed only when the two are within an effective NFC communication range, while in this embodiment, by using the NFC touch apparatus, there is no time or distance limitation on data transmission between the first NFC device and the second NFC device any longer.

Optionally, in Embodiment 1, the NFC touch apparatus may trigger, in the following two specific manners, the first NFC device to perform intelligent extraction processing on the to-be-transmitted data determined by the first NFC device to obtain the intelligently extracted data.

Manner 1: The NFC touch apparatus sends the intelligent extraction instruction to the first NFC device by using a touchscreen of the first NFC device, to trigger the first NFC device to perform intelligent extraction processing on the to-be-transmitted data determined by the first NFC device to obtain the intelligently extracted data.

In this manner, the NFC touch apparatus sends intelligent extraction processing to the touchscreen of the first NFC device, to trigger the first NFC device to perform intelligent extraction processing on the to-be-transmitted data determined by the first NFC device to obtain the intelligently extracted data.

A specified switch, button, scroll key, or the like may be disposed on the NFC touch apparatus to trigger the NFC touch apparatus to send an intelligent extraction instruction, may be disposed on the NFC touch apparatus. By using an example in which the NFC touch apparatus is a touch pen, if a button is disposed on the touch pen, an intelligent extraction instruction can be sent to the first NFC device by pressing the button and touching the touchscreen of the first NFC device with a nib of the touch pen.

Manner 2: The NFC touch apparatus sends the intelligent extraction instruction to the first NFC device by means of NFC communication, to trigger the first NFC device to perform intelligent extraction processing on the to-be-transmitted data determined by the first NFC device to obtain the intelligently extracted data.

In this manner, the intelligent extraction instruction is exchanged between the NFC touch apparatus and the first NFC device by means of NFC communication, to trigger the first NFC device to perform intelligent extraction processing on the to-be-transmitted data determined by the first NFC device to obtain the intelligently extracted data. By using an example in which the NFC touch apparatus is a touch pen, if an NFC antenna area of the touch pen is near an NFC antenna area of the first NFC device, the touch pen and the first NFC device may perform NFC communication when the two are within an effective communication range, the touch pen sends an intelligent extraction instruction to the first NFC device.

Optionally, in Embodiment 1, if the to-be-transmitted data is the data selected by the NFC touch apparatus on the touchscreen of the first NFC device, the NFC touch apparatus may trigger, at the following specific moments, the first NFC device to perform intelligent extraction processing on the to-be-transmitted data determined by the first NFC device to obtain the intelligently extracted data.

Moment 1: Before selecting the to-be-transmitted data, the NFC touch apparatus sends the intelligent extraction instruction to the first NFC device by using the touchscreen of the first NFC device.

Moment 2: When selecting the to-be-transmitted data, the NFC touch apparatus sends the intelligent extraction instruction to the first NFC device by using the touchscreen of the first NFC device.

Moment 3: After the first NFC device determines the to-be-transmitted data and before the NFC touch apparatus and the first NFC device are within an NFC communication range, the NFC touch apparatus sends the intelligent extraction instruction to the first NFC device by using the touchscreen of the first NFC device.

Moment 4: After the first NFC device determines the to-be-transmitted data and when the NFC touch apparatus and the first NFC device are within an NFC communication range, the NFC touch apparatus sends the intelligent extraction instruction to the first NFC device by means of NFC communication.

Optionally, in Embodiment 1, if the to-be-transmitted data is the data currently displayed on the first NFC device, the NFC touch apparatus may trigger, at the following specific moments, the first NFC device to perform intelligent extraction processing on the to-be-transmitted data determined by the first NFC device to obtain the intelligently extracted data.

Moment 1: After the first NFC device determines the to-be-transmitted data and when the NFC touch apparatus and the first NFC device are not within an NFC communication range, the NFC touch apparatus sends the intelligent extraction instruction to the first NFC device by using the touchscreen of the first NFC device.

Moment 2: After the first NFC device determines the to-be-transmitted data and when the NFC touch apparatus and the first NFC device are within an NFC communication range, the NFC touch apparatus sends the intelligent extraction instruction to the first NFC device by means of NFC communication.

Optionally, in Embodiment 1, the NFC touch apparatus may work in a card emulation mode (CE), a peer to peer mode (P2P), or a reader/writer mode (R/W).

Figure 2:
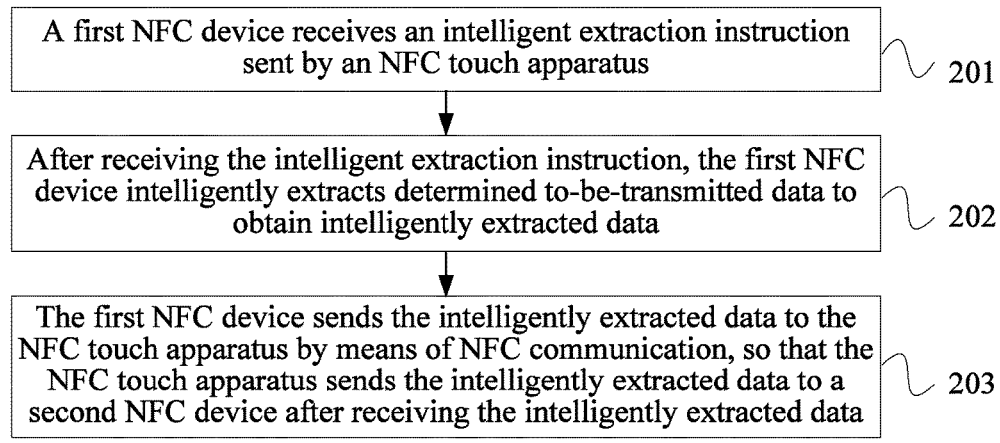
FIG. 2 is a flowchart of Embodiment 2 of a near field communication-based data transmission method according to the present disclosure.

FIG. 2 is a flowchart of Embodiment 2 of a near field communication-based data transmission method according to the present disclosure. This embodiment is applicable to a scenario in which there are at least two NFC devices and an NFC touch apparatus in a near field communication NFC system. The NFC touch apparatus may be disposed independently or may be integrated in a third device. This embodiment is executed by a first NFC device. This embodiment may include the following steps.

201: The first NFC device receives an intelligent extraction instruction sent by an NFC touch apparatus.

202: After receiving the intelligent extraction instruction, the first NFC device intelligently extracts determined to-be-transmitted data to obtain intelligently extracted data.

203: The first NFC device sends the intelligently extracted data to the NFC touch apparatus by means of NFC communication, so that the NFC touch apparatus sends the intelligently extracted data to a second NFC device after receiving the intelligently extracted data.

In the foregoing step, for specific description about intelligent extraction processing and the intelligently extracted data, reference may be made to Embodiment 1 in FIG. 1, and details are not described herein again.

According to the near field communication NFC-based data transmission method provided in this embodiment of the present disclosure, a first NFC device performs intelligent extraction processing on determined to-be-transmitted data according to an intelligent extraction instruction sent by an NFC touch apparatus, to obtain intelligently extracted data, then the intelligently extracted data is transmitted first from the first NFC device to the NFC touch apparatus and then from the NFC touch apparatus to a second NFC device, and finally, data transmission and information sharing between the first NFC device and the second NFC device are implemented. In the transmission process, because a size of the NFC touch apparatus is smaller than sizes of the first NFC device and the second NFC device, an NFC antenna of the NFC touch apparatus and an NFC antenna of the first NFC device as well as an NFC antenna of the second NFC device are easily within an effective communication range, which effectively reduces a probability of unsuccessful communication caused because sizes of NFC devices may be different and a user may not know a specific area of an NFC antenna clearly, and avoids problems of poor user experience and an uncomfortable feeling that are brought by a back-to-back communication manner of two NFC devices. In addition, compared with a case in which two NFC devices directly perform data transmission in the prior art, the two NFC devices must approach each other, and data transmission can be performed only when the two are within an effective NFC communication range, while in this embodiment, by using the NFC touch apparatus, there is no time or distance limitation on data transmission between the first NFC device and the second NFC device any longer.

Optionally, in Embodiment 2, the first NFC device and the second NFC device may work in a card emulation mode, a peer to peer mode, or a reader/writer mode.

Figure 3A:
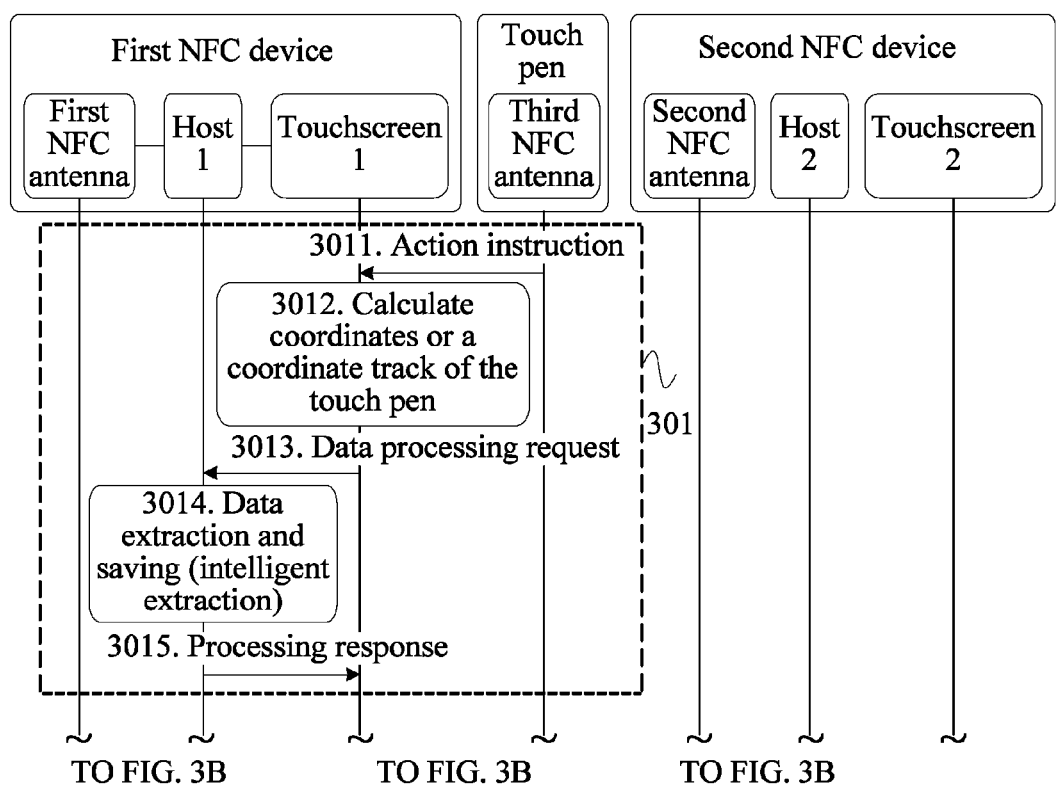
FIG. 3A and FIG. 3B are a signaling diagram of Embodiment 3 of a near field communication-based data transmission method according to the present disclosure.
Figure 3B:
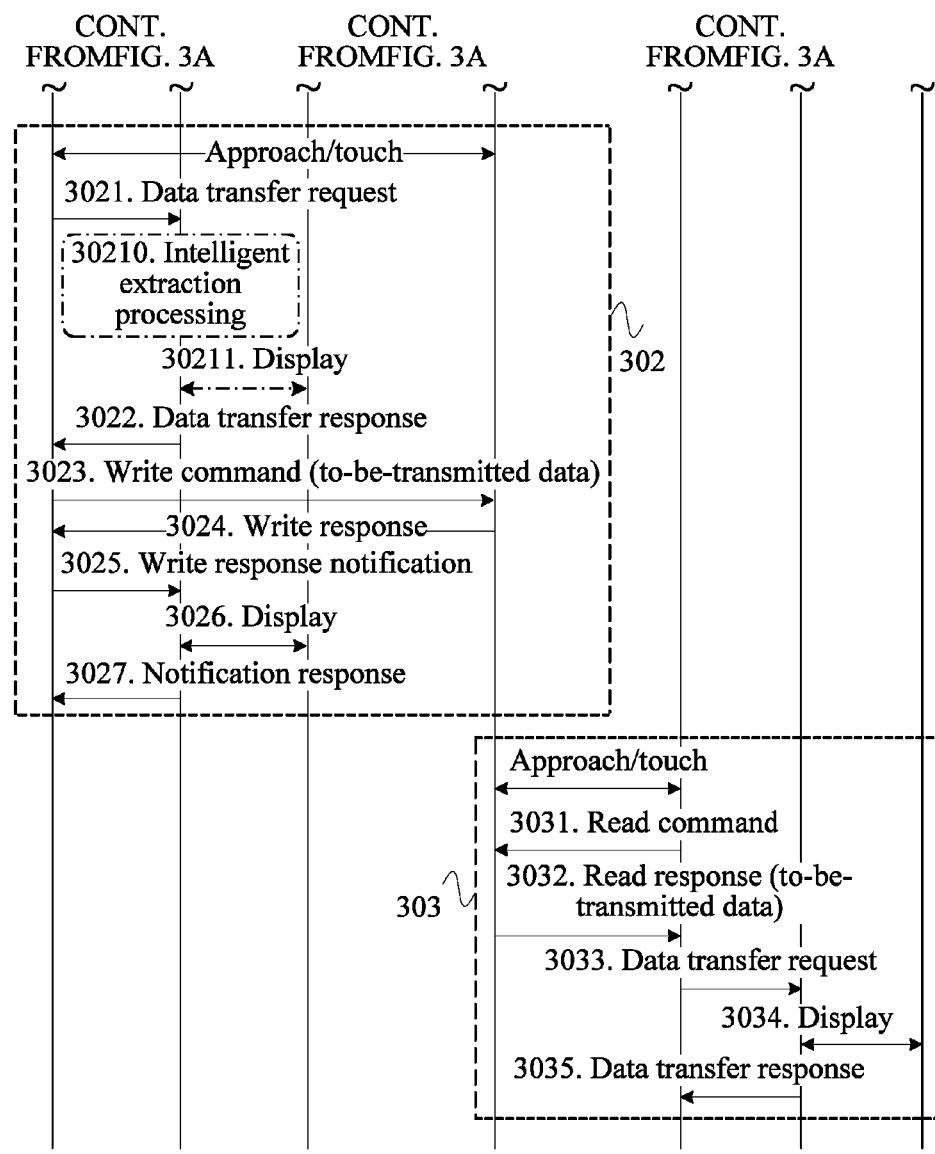

FIG. 3A and FIG. 3B are a signaling diagram of Embodiment 3 of a near field communication-based data transmission method according to the present disclosure. In this embodiment, an NFC touch apparatus is a touch pen, and may work in a card emulation mode as an NFC tag and perform NFC communication with a first NFC device and a second near field communication device successively. The first NFC device includes a first NFC module, a host 1, and a touchscreen 1, where the touchscreen 1 may include a detector 1 and a controller 1 (the detector 1 and the controller 1 are not shown in the figure), and the second NFC device includes a second NFC module, a host 2, and a touchscreen 2, where the touchscreen 2 may include a detector 2 and a controller 2 (the detector 2 and the controller 2 are not shown in the figure). This embodiment includes the following steps.

301: The touch pen selects to-be-transmitted data on the first NFC device.

This step includes the following substeps.

3011: The touch pen sends, to the touchscreen 1 of the first NFC device, an action instruction, such as ticking, drawing a circle to take a screenshot, tapping to select all, writing a text, or drawing.

3012: The touchscreen 1 detects position information of the touch pen by using the detector 1, and calculates coordinates or a coordinate track of the touch pen by using the controller 1.

3013: The controller 1 of the touchscreen 1 sends the foregoing calculation result to the host 1 of the first NFC device by using a data processing request.

3014: The host 1 of the first NFC device extracts, according to the received coordinates or coordinate track, the to-be-transmitted data selected by the touch pen, and saves the to-be-transmitted data.

Optionally, in this step, when extracting the to-be-transmitted data, the host 1 of the first NFC device may also intelligently extract the to-be-transmitted data. Therefore, when selecting the to-be-transmitted data or even before selecting the to-be-transmitted data, the touch pen may send an intelligent extraction instruction (which is not shown in FIG. 1) to the first NFC device by using a touchscreen of the first NFC device, so that the host 1 of the first NFC device performs intelligent extraction processing on the to-be-transmitted data.

In a feasible implementation manner, after receiving the intelligent extraction instruction, the first NFC device may intelligently extract the to-be-transmitted data according to a type, such as a resource file, contact information, or network information, of the to-be-transmitted data to obtain intelligently extracted data.

For example, if the type of the to-be-transmitted data is a resource file, the first NFC device extracts wireless connection configuration information of the first NFC device to obtain the intelligently extracted data; or the first NFC device extracts wireless connection configuration information of the first NFC device and attribute information of the resource file to obtain the intelligently extracted data. The wireless connection configuration information includes BLUETOOTH configuration information and/or WiFi configuration information.

The resource file may be a picture, audio, a video, software, or the like, and after receiving the intelligent extraction instruction, the first NFC device may directly extract wireless connection configuration information about BLUETOOTH and/or WiFi of the first NFC device to obtain the intelligently extracted data. After obtaining the intelligently extracted data by using the touch pen, the second NFC device may establish a BLUETOOTH or WiFi connection to the first NFC device according to the wireless connection configuration information in the intelligently extracted data, and the to-be-transmitted data needs to be selected again by means of a manual operation or the like, so that the resource file is received from the first NFC device through the established wireless connection.

In addition, after receiving the intelligent extraction instruction, the first NFC device may directly extract wireless connection configuration information about BLUETOOTH and/or WiFi of the first NFC device and attribute information, such as a name or a storage path, of the resource file together as intelligently extracted data. After obtaining the intelligently extracted data by using the touch pen, the second NFC device may establish a BLUETOOTH or WiFi connection to the first NFC device according to the wireless connection configuration information in the intelligently extracted data, and then acquire the resource file from the first NFC device through the established wireless connection according to the attribute information of the resource file in the intelligently extracted data. In this way, the to-be-transmitted data does not need to be selected again on the first NFC device by means of a manual operation or the like.

For another example, if the type of the to-be-transmitted data is contact information, the first NFC device extracts the contact information to obtain the intelligently extracted data; or the first NFC device extracts the contact information and operation instruction information corresponding to the contact information to obtain the intelligently extracted data.

The contact information may be information about a contact in a chat communication application such as WECHAT, FETION, BAIDUHI, MICROBLOG, RENREN, QQ, FACEBOOK, TWITTER, ALIWANGWANG, MSN, or ANYCHAT. By using QQ as an example, if contact information such as a QQ number or a net name of a buddy in a buddy list is to be shared with the second NFC device, after receiving the intelligent extraction instruction, the host 1 of the first NFC device extracts the QQ number and/or the net name of the contact (or a buddy adding request) as intelligently extracted data, and may also extract an application login request (and a download address corresponding to the application) together with the QQ number and/or the net name (or the buddy adding request) as intelligently extracted data to be shared with the second NFC device by using the touch pen.

After the second NFC device receives the intelligently extracted data, if the second NFC device has logged onto QQ currently, information webpage of the contact is directly opened, a user is prompted whether to add the contact as a buddy, or the like; otherwise, if QQ is not installed in the second NFC device currently, a user may be prompted whether to immediately download the application according to the download address corresponding to the application; if QQ is installed in the second NFC device currently but the second NFC device has not logged onto QQ currently, a user may be prompted, according to the application login request, whether to log on to the QQ application, and if the user logs on to QQ, the information webpage of the contact is directly opened (and the user is prompted whether to add the contact as a buddy), otherwise, the intelligently extracted data is stored as a memo or in another manner.

For another example, if the type of the to-be-transmitted data is network information, the first NFC device extracts at least one or a combination of website information of the network information, text information corresponding to the network information, and operation instruction information corresponding to the network information to obtain the intelligently extracted data.

The network information may be SINA news, SOHU news, or the like. After the to-be-shared information is selected, after receiving the intelligent extraction instruction, the first NFC device extracts a title and/or corresponding website information of the information as intelligently extracted data, and shares the intelligently extracted data with the second NFC device by using the touch pen. After receiving the intelligently extracted data, the second NFC device may directly open a webpage of the to-be-shared information according to the website information in the intelligently extracted data, or may start a browser of the second NFC device according to the title of the information in the intelligently extracted data to search for the information.

In another feasible implementation manner, after receiving the intelligent extraction instruction, the first NFC device intelligently extracts the to-be-transmitted data according to a size of the to-be-transmitted data to obtain intelligently extracted data.

For example, if the size of the to-be-transmitted data is greater than or equal to a preset length threshold, the first NFC device extracts wireless connection configuration information of the first NFC device to obtain the intelligently extracted data; or the first NFC device extracts wireless connection configuration information of the first NFC device and attribute information of the resource file to obtain the intelligently extracted data. Then the second NFC device establishes a connection to the first NFC device according to the wireless connection configuration information transmitted by the touch pen, and the to-be-transmitted data is transmitted through the successfully established connection. For example, the to-be-transmitted data is an application program of 2 M, and the preset length threshold is 1 M; therefore, the first NFC device extracts wireless connection configuration information of the first NFC device as intelligently extracted data, then the intelligently extracted data is transmitted to the second NFC device by the NFC touch pen, and finally, the second NFC device establishes a connection to the first NFC device according to the wireless connection configuration information, and acquires the application program through the successfully established wireless connection.

For another example, if the size of the to-be-transmitted data is less than a preset length threshold, the first NFC device extracts the to-be-transmitted data to obtain the intelligently extracted data; or the first NFC device extracts the to-be-transmitted data and operation instruction information corresponding to the to-be-transmitted data to obtain the intelligently extracted data.

3015: The host 1 of the first NFC device feeds back a final processing result to the touchscreen 1, and displays the final processing result.

If the data extraction is successful, the host 1 sends a response message indicating that the processing is successful to the touchscreen 1, so that the touchscreen 1 displays information that the processing is successful; otherwise, the host 1 sends a response message indicating that the processing is unsuccessful to the touchscreen 1, so that the touchscreen 1 displays information that the processing is unsuccessful.

In addition, if intelligent extraction is performed in step 3014, and if the data extraction, namely, the intelligent extraction, is successful, the host 1 sends a response message indicating that the processing is successful to the touchscreen 1, so that the touchscreen 1 displays information that the processing is successful; otherwise, the host 1 sends a response message indicating that the processing is unsuccessful to the touchscreen 1, so that the touchscreen 1 displays information that the processing is unsuccessful.

302: The first NFC device transfers intelligently extracted data to the touch pen.

The touch pen approaches or touches the first NFC device, so that the two are within an effective communication range so as to transfer the data from the first NFC device to the touch pen. This step includes the following substeps.

3021: The first NFC module of the first NFC device sends a data transfer request to the host 1.

When the first NFC device and the touch pen are within an effective NFC communication range, if it is detected that the touch pen works in a card emulation mode, the first NFC module sends a data transfer request to the host 1; in this way, the request can trigger the host 1 to perform intelligent extraction processing, that is, perform steps 30210 and 30211 shown by using dash-and-dot lines in the figure; or the first NFC device may read an intelligent extraction instruction saved in the touch pen (the intelligent extraction instruction is not shown in FIG. 3A and FIG. 3B); in this way, the instruction can cause the first NFC module to instruct the host 1 to perform intelligent extraction processing, that is, perform steps 30210 and 30211 shown by using dash-and-dot lines in the figure.

30210: The host 1 of the first NFC device performs intelligent extraction processing on the to-be-transmitted data to obtain intelligently extracted data.

30211: The host 1 of the first NFC device feeds back a result of the intelligent extraction processing to the touchscreen 1 and displays the result.

3022: The host 1 of the first NFC device sends, to the first NFC module, a data transfer response including the intelligently extracted data obtained by performing intelligent extraction processing.

3023: The first NFC device sends a write command to the touch pen, so as to write the intelligently extracted data into the touch pen.

3024: The touch pen sends a write response to the first NFC device to feed back a result.

3025: The first NFC module of the first NFC device sends a write response notification to the host 1.

3026: The touchscreen 1 of the first NFC device displays a result of a write operation.

In this step, if the intelligently extracted data is successfully transferred to the touch pen through step 3023, a result that the write operation is successful is displayed; otherwise, a result that the write operation is unsuccessful is displayed.

3027: The host 1 of the first NFC device sends a notification response to the first NFC module.

After a result that the write operation is successful or the write operation is unsuccessful is correctly displayed, the host 1 sends a notification response to the first NFC module.

In the foregoing steps 3025 to 3027, the first NFC module of the first NFC device transfers, by using the host 1, the result of the write operation of the first NFC module to the touchscreen 1 to display the result.

303: The touch pen transfers the intelligently extracted data to the second NFC device.

The touch pen approaches or touches the second NFC device, so that the two are within an effective communication range so as to transfer the data from the touch pen to the second NFC device. This step includes the following substeps.

3031: The second NFC device sends a read command to the touch pen.

3032: The touch pen feeds back a read response including the intelligently extracted data to the second NFC device.

3033: The second NFC module of the second NFC device sends a data transfer request including the intelligently extracted data to the host 2.

In this step, the host 2 of the second NFC device performs corresponding processing according to the received intelligently extracted data. Reference may be made to the description of the second NFC device in the foregoing step 3014, and details are not described herein again.

3034: The host 2 of the second NFC device displays a result of a read operation by using the touchscreen 2.

In this step, if the to-be-transmitted data is successfully transferred to the second NFC device in step 3034, a result that the read operation is successful and the to-be-transmitted data are displayed; otherwise, a result that the read operation is unsuccessful is displayed.

3035: The host 2 of the second NFC device feeds back a data transfer response to the second NFC module.

Figure 4A:
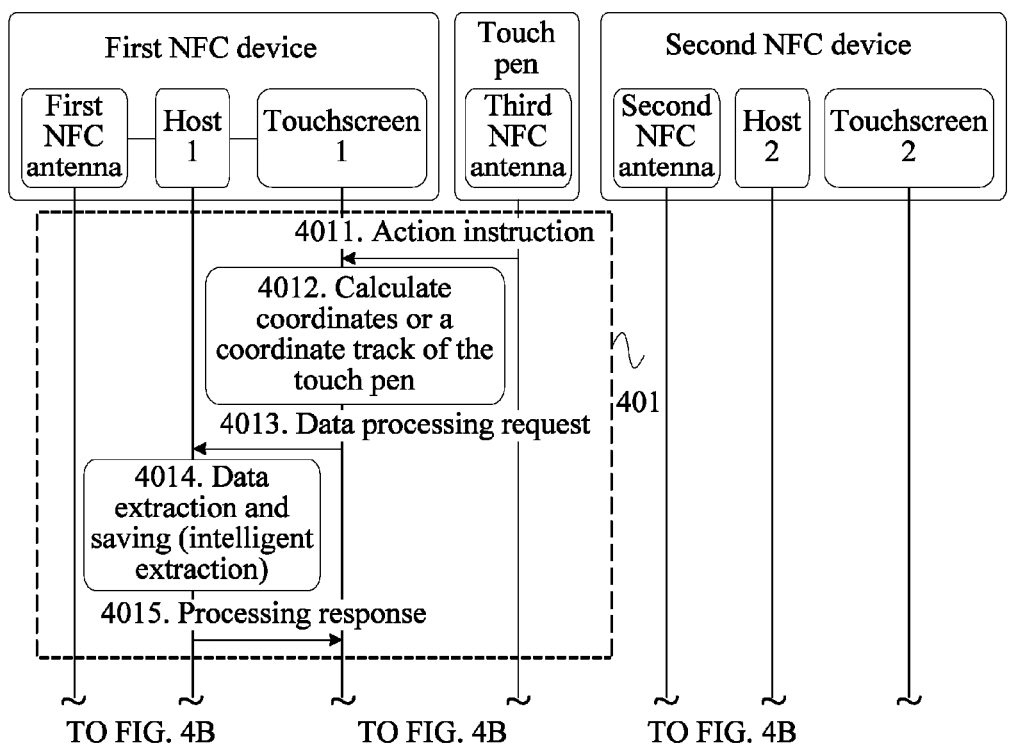
FIG. 4A and FIG. 4B are a signaling diagram of Embodiment 4 of a near field communication-based data transmission method according to the present disclosure.
Figure 4B:
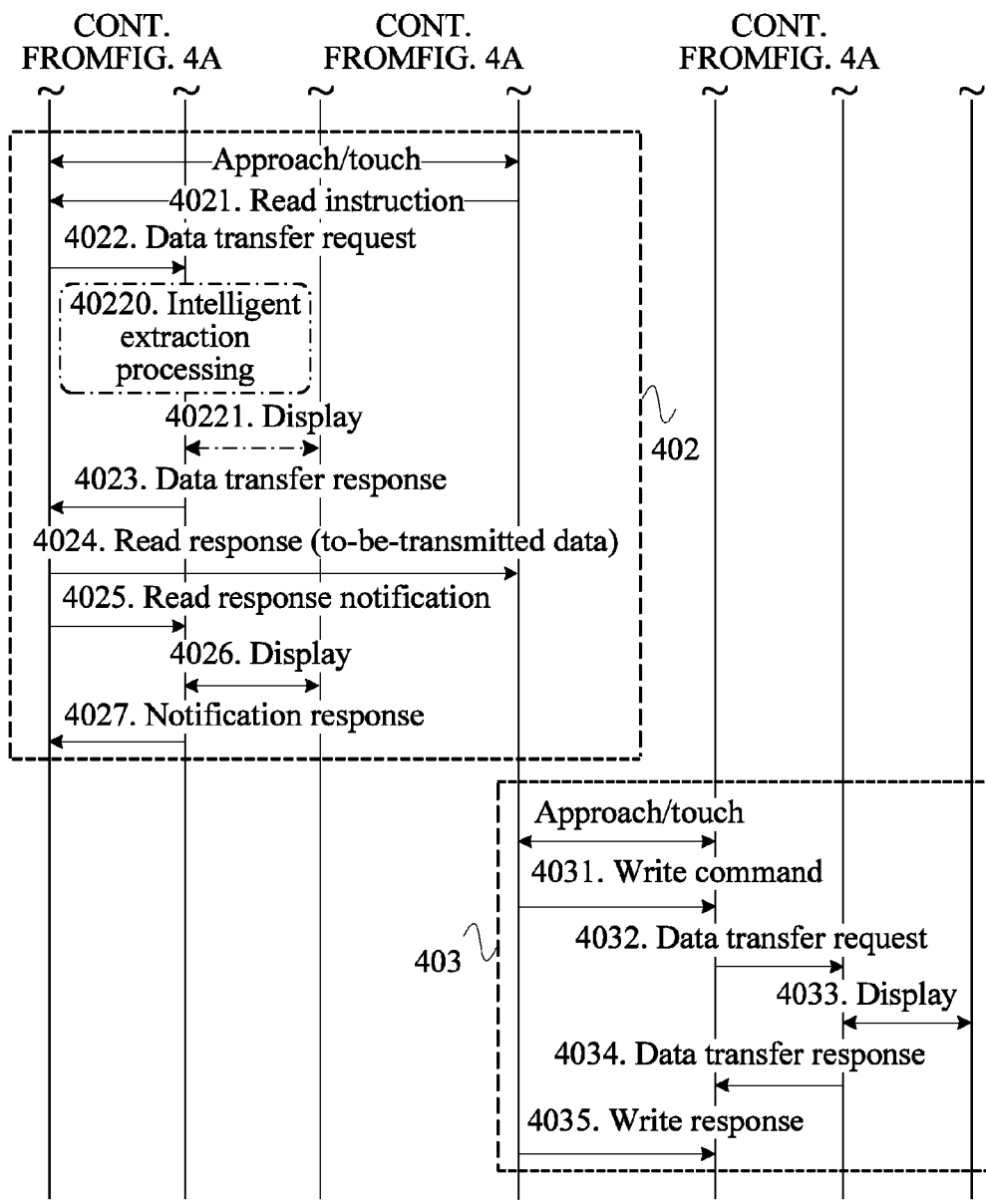

FIG. 4A and FIG. 4B are a signaling diagram of Embodiment 4 of a near field communication-based data transmission method according to the present disclosure. In this embodiment, an NFC touch apparatus is a touch pen, and may work in a reader/writer mode as an NFC reader/writer and perform NFC communication with a first NFC device and a second NFC device successively. The first NFC device includes a first NFC module, a host 1, and a touchscreen 1, where the touchscreen 1 may include a detector 1 and a controller 1 (the detector 1 and the controller 1 are not shown in the figure), and the second NFC device includes a second NFC module, a host 2, and a touchscreen 2, where the touchscreen 2 may include a detector 2 and a controller 2 (the detector 2 and the controller 2 are not shown in the figure). This embodiment includes the following steps.

401: The touch pen selects to-be-transmitted data on the first NFC device.

This step includes the following substeps.

4011: The touch pen sends, to the touchscreen 1 of the first NFC device, an action instruction, such as ticking, drawing a circle to take a screenshot, tapping to select all, writing a text, or drawing.

4012: The touchscreen 1 detects position information of the touch pen by using the detector 1, and calculates coordinates or a coordinate track of the touch pen by using the controller 1.

4013: The controller 1 of the touchscreen 1 sends the foregoing calculation result to the host 1 of the first NFC device by using a data processing request.

4014: The host 1 of the first NFC device performs, according to the received coordinates or coordinate track, data extraction on the to-be-transmitted data selected by the touch pen, and saves the to-be-transmitted data.

4015: The host 1 of the first NFC device feeds back a final processing result to the touchscreen 1 by using a processing response, and displays the final processing result.

For the foregoing steps 4011 to 4015, reference may be made to steps 3011 to 3015 in the foregoing embodiment in FIG. 3A and FIG. 3B, and details are not described herein again.

402: The first NFC device transfers intelligently extracted data to the touch pen.

The touch pen approaches or touches the first NFC device, so that the two are within an effective communication range so as to transfer the data from the first NFC device to the touch pen. This step includes the following substeps.

4021: A third NFC module of the touch pen sends a read instruction to the first NFC module of the first NFC device.

4022: The first NFC module of the first NFC device sends a data transfer request to the host 1.

When the first NFC device and the touch pen are within an effective NFC communication range, if it is detected that the touch pen is an NFC tag, a data transfer request is actively sent to the host 1; in this way, the request can trigger the host 1 to perform intelligent extraction processing, that is, perform steps 40220 and 40221 shown by using dash-and-dot lines in the figure; or the first NFC device may read, by means of NFC communication, an intelligent extraction instruction saved in the touch pen (the intelligent extraction instruction is not shown in FIG. 4A and FIG. 4B), and instruct the host 1 to perform intelligent extraction processing, that is, perform steps 40220 and 40221 shown by using dash-and-dot lines in the figure.

40220: The host 1 of the first NFC device performs intelligent extraction processing on the to-be-transmitted data.

40221: The host 1 of the first NFC device feeds back a result of the intelligent extraction processing to the touchscreen 1 and displays the result.

4023: The host 1 of the first NFC device sends, to the first NFC module, a data transfer response including the intelligently extracted data obtained by performing intelligent extraction processing.

4024: The first NFC device sends a read response including the intelligently extracted data to the touch pen.

4025: The first NFC module of the first NFC device sends a read response notification to the host 1.

4026: The touchscreen 1 of the first NFC device displays a result of a read operation.

4027: The host 1 of the first NFC device sends a notification response to the first NFC module.

403: The touch pen transfers intelligently extracted data to the second NFC device.

The touch pen approaches or touches the second NFC device, so that the two are within an effective communication range so as to transfer the data from the touch pen to the second NFC device. This step includes the following substeps.

4031: The touch pen sends a write command including the intelligently extracted data to the second NFC device.

4032: The second NFC module of the second NFC device sends a data transfer request including the intelligently extracted data to the host 2.

4033: The touchscreen 2 of the second NFC device displays a result of a read operation.

4034: The host 2 of the second NFC device sends a data transfer response to the second NFC module.

4035: The second NFC module of the second NFC device sends a write response to the touch pen.

Optionally, for details about the intelligent extraction processing involved in the foregoing steps in this embodiment, reference may be made to the foregoing embodiments shown in FIG. 2, FIG. 3A, and FIG. 3B, and details are not described herein again.

Figure 5A:
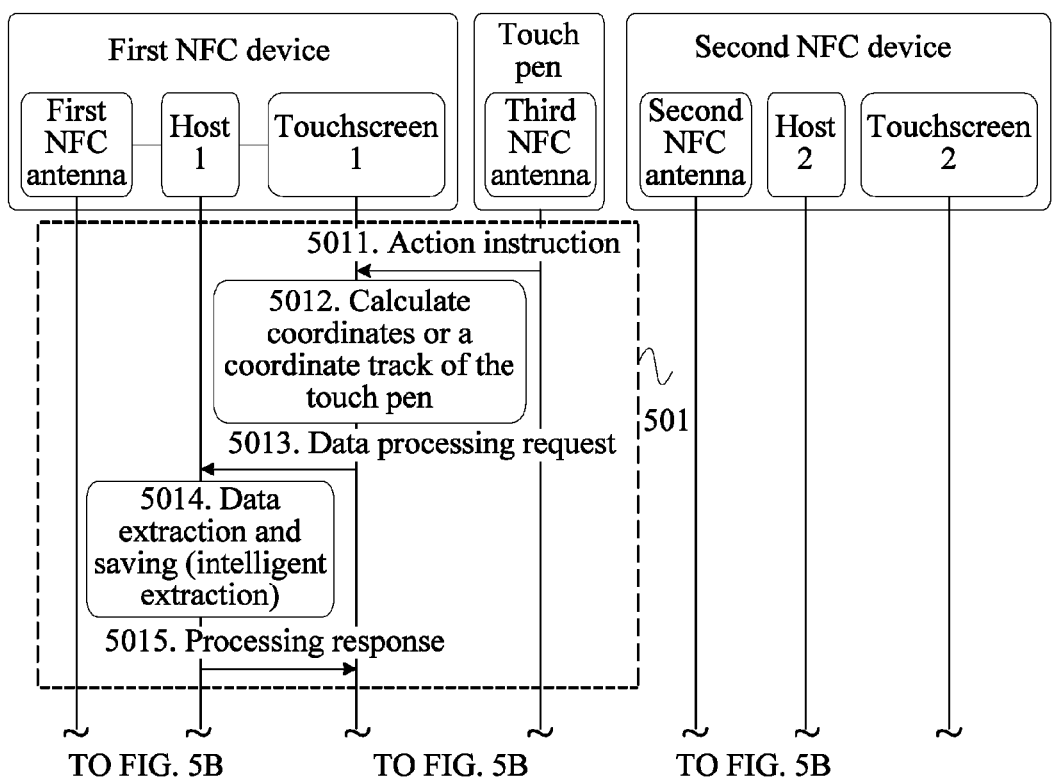
FIG. 5A and FIG. 5B are a signaling diagram of Embodiment 5 of a near field communication-based data transmission method according to the present disclosure.
Figure 5B:
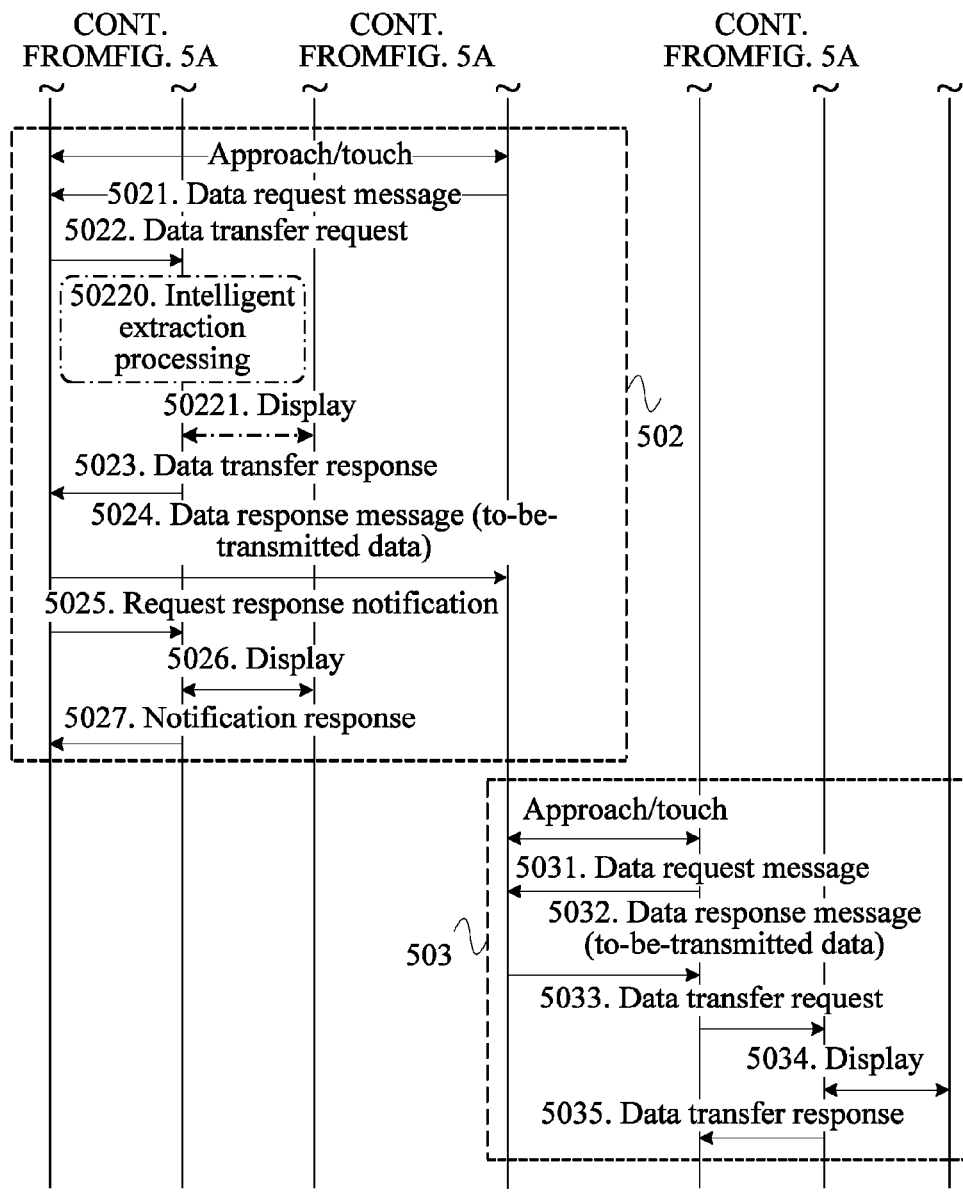

FIG. 5A and FIG. 5B are a signaling diagram of Embodiment 5 of a near field communication-based data transmission method according to the present disclosure. In this embodiment, an NFC touch apparatus is a touch pen, and may work in a peer to peer mode as a third device and perform NFC communication with a first NFC device and a second near field communication device successively. The first NFC device includes a first NFC module, a host 1, and a touchscreen 1, where the touchscreen 1 may include a detector 1 and a controller 1 (the detector 1 and the controller 1 are not shown in the figure), and the second NFC device includes a second NFC module, a host 2, and a touchscreen 2, where the touchscreen 2 may include a detector 2 and a controller 2 (the detector 2 and the controller 2 are not shown in the figure). This embodiment includes the following steps.

501: The touch pen selects to-be-transmitted data on the first NFC device.

This step includes the following substeps.

5011: The touch pen sends, to the touchscreen 1 of the first NFC device, an action instruction, such as ticking, drawing a circle to take a screenshot, tapping to select all, writing a text, or drawing.

5012: The touchscreen 1 detects position information of the touch pen by using the detector 1, and calculates coordinates or a coordinate track of the touch pen by using the controller 1.

5013: The controller 1 of the touchscreen 1 sends the foregoing calculation result to the host 1 of the first NFC device by using a data processing request.

5014: The host 1 of the first NFC device performs, according to the received coordinates or coordinate track, data extraction on the to-be-transmitted data selected by the touch pen, and saves the to-be-transmitted data.

5015: The host 1 of the first NFC device feeds back a final processing result to the touchscreen 1 by using a processing response, and displays the final processing result.

For the foregoing steps 5011 to 5015, reference may be made to steps 3011 to 3015 in the foregoing embodiment in FIG. 3A and FIG. 3B, and details are not described herein again.

502: The first NFC device transfers intelligently extracted data to the touch pen.

The touch pen approaches or touches the first NFC device, so that the two are within an effective communication range so as to transfer the data from the first NFC device to the touch pen. This step includes the following substeps.

5021: The touch pen sends a data request message to the first NFC module of the first NFC device.

5022: The first NFC module of the first NFC device sends a data transfer request to the host 1.

When the first NFC device and the touch pen are within an effective NFC communication range, if it is detected that the touch pen works in the peer to peer mode, a data transfer request is actively sent to the host 1; in this way, the request can trigger the host 1 to perform intelligent extraction processing, that is, perform steps 50220 and 50221 shown by using dash-and-dot lines in the figure; or the first NFC device may instruct, according to an intelligent extraction instruction sent by the touch pen to the first NFC device by means of NFC communication (the intelligent extraction instruction is not shown in FIG. 5A and FIG. 5B), the host 1 to perform intelligent extraction processing, that is, perform steps 50220 and 50221 shown by using dash-and-dot lines in the figure.

50220: The host 1 of the first NFC device performs intelligent extraction processing on the to-be-transmitted data to obtain intelligently extracted data.

50221: The host 1 of the first NFC device feeds back a result of the intelligent extraction processing to the touchscreen 1 and displays the result.

5023: The host 1 of the first NFC device sends a data transfer response including the intelligently extracted data to the first NFC module.

5024: The first NFC device sends a data response message including the intelligently extracted data to the touch pen.

5025: The first NFC module of the first NFC device sends a request response notification to the host 1.

5026: The touchscreen 1 of the first NFC device displays a result of a write operation.

5027: The host 1 of the first NFC device sends a notification response to the first NFC module.

503: The touch pen transfers the intelligently extracted data to the second NFC device.

A third NFC module of the touch pen approaches or touches the second NFC module of the second NFC device, so that the third NFC module of the touch pen and the second NFC module of the second NFC device are within an effective communication range so as to transfer the data from the touch pen to the second NFC device. This step includes the following substeps.

5031: The second NFC module of the second NFC device sends a data request message to the touch pen.

5032: The touch pen sends a data response message including the intelligently extracted data to the second NFC device.

5033: The second NFC module of the second NFC device sends a data transfer request including the intelligently extracted data to the host 2.

5034: The touchscreen 2 of the second NFC device displays a result of a data request operation.

5035: The host 2 of the second NFC device sends a data transfer response to the second NFC module.

Optionally, for details about the intelligent extraction processing involved in the foregoing steps in this embodiment, reference may be made to the foregoing embodiments shown in FIG. 2, FIG. 3A, and FIG. 3B, and details are not described herein again.

It should be noted that in Embodiment 3 in FIG. 3A and FIG. 3B, the NFC touch apparatus, that is, the touch pen, works in a card emulation mode as an NFC tag in a process of performing NFC communication with the first NFC device and the second NFC device; in Embodiment 4 in FIG. 4A and FIG. 4B, the NFC touch apparatus, that is, the touch pen, works in a reader/writer mode in a process of performing NFC communication with the first NFC device and the second NFC device; in Embodiment 5 in FIG. 5A and FIG. 5B, the NFC touch apparatus, that is, the touch pen, works in a peer to peer mode in a process of performing NFC communication with the first NFC device and the second NFC device. However, the present disclosure is not limited thereto. In other feasible implementation manners, the NFC touch apparatus may also work in a card emulation mode to perform NFC communication with the first NFC device and work in a reader/writer or a peer to peer mode to perform NFC communication with the second NFC device; or the NFC touch apparatus may also work in a reader/writer mode to perform NFC communication with the first NFC device and work in a card emulation mode or a peer to peer mode to perform NFC communication with the second NFC device; or the NFC touch apparatus may also work in a peer to peer mode to perform NFC communication with the first NFC device and work in a card emulation mode or a reader/writer mode to perform NFC communication with the second NFC device.

Figure 6:
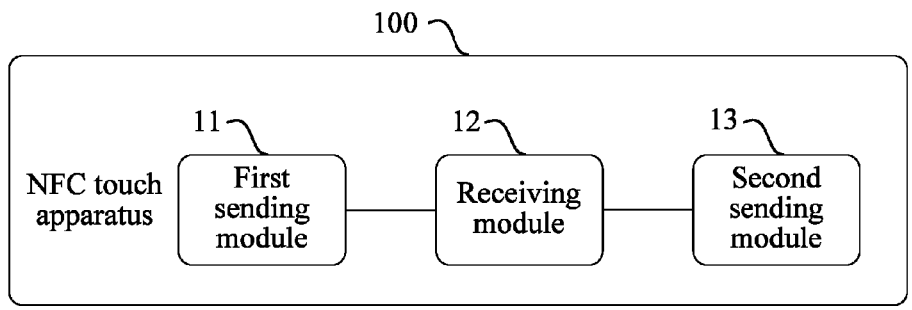
FIG. 6 is a schematic architectural diagram of Embodiment 1 of an NFC touch apparatus according to the present disclosure.

FIG. 6 is a schematic architectural diagram of Embodiment 1 of an NFC touch apparatus according to the present disclosure. The NFC touch apparatus provided in this embodiment may be disposed on a near field communication device, or may be a near field communication device. An NFC touch apparatus 100 provided in this embodiment includes a first sending module 11 configured to send an intelligent extraction instruction to a first NFC device, to trigger the first NFC device to perform intelligent extraction processing on to-be-transmitted data determined by the first NFC device to obtain intelligently extracted data; a receiving module 12 configured to receive the intelligently extracted data that is sent by the first NFC device by means of NFC communication; and a second sending module 13 configured to send the intelligently extracted data to a second NFC device by means of NFC communication, where a size of the NFC touch apparatus is smaller than sizes of the first NFC device and the second NFC device.

According to the NFC touch apparatus provided in this embodiment of the present disclosure, the NFC touch apparatus approaches or touches a first NFC device and a second NFC device successively, so as to complete data transmission first from the first NFC device to the NFC touch apparatus and then from the NFC touch apparatus to the second NFC device, and finally, data transmission and information sharing between the first NFC device and the second NFC device are implemented. In the transmission process, because a size of the NFC touch apparatus is far smaller than sizes of the first NFC device and the second NFC device, an NFC antenna of the NFC touch apparatus and an NFC antenna of the first NFC device as well as an NFC antenna of the second NFC device are easily within an effective communication range, which effectively reduces a probability of unsuccessful communication caused because sizes of NFC devices may be different and a user may not know a specific area of an NFC antenna clearly, and avoids problems of poor user experience and an uncomfortable feeling that are brought by a back-to-back communication manner of two NFC devices. In addition, compared with a case in which two NFC devices directly perform data transmission in the prior art, the two NFC devices must approach each other, and data transmission can be performed only when the two are within an effective NFC communication range, while in this embodiment, by using the NFC touch apparatus, there is no time or distance limitation on data transmission between the first NFC device and the second NFC device any longer.

Figure 7:
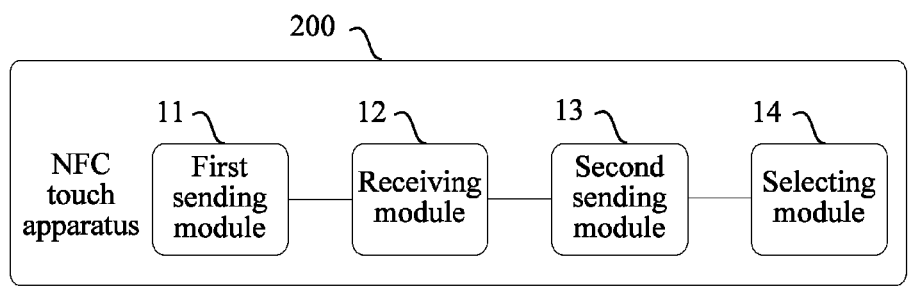
FIG. 7 is a schematic structural diagram of Embodiment 2 of an NFC touch apparatus according to the present disclosure.

FIG. 7 is a schematic structural diagram of Embodiment 2 of an NFC touch apparatus according to the present disclosure. As shown in FIG. 7, based on a structure of the apparatus in FIG. 6, an NFC touch apparatus 200 in this embodiment further includes a selecting module 14; and the to-be-transmitted data determined by the first NFC device includes data selected by the selecting module 14 on a touchscreen of the first NFC device; or the to-be-transmitted data determined by the first NFC device includes data currently displayed on the first NFC device.

Further, the first sending module 11 is configured to send the intelligent extraction instruction to the first NFC device by using the touchscreen of the first NFC device, to trigger the first NFC device to perform intelligent extraction processing on the to-be-transmitted data determined by the first NFC device to obtain the intelligently extracted data.

Further, the first sending module 11 is configured to send the intelligent extraction instruction to the first NFC device by means of NFC communication, to trigger the first NFC device to perform intelligent extraction processing on the to-be-transmitted data determined by the first NFC device to obtain the intelligently extracted data.

Further, the first sending module 11 is configured to send, after the first NFC device determines the to-be-transmitted data and when the NFC touch apparatus and the first NFC device are not within an NFC communication range, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or the first sending module 11 is configured to send, after the first NFC device determines the to-be-transmitted data and when the NFC touch apparatus and the first NFC device are within an NFC communication range, the intelligent extraction instruction to the first NFC device by means of NFC communication, to trigger the first NFC device to perform intelligent extraction processing on the to-be-transmitted data determined by the first NFC device to obtain the intelligently extracted data.

Further, if the to-be-transmitted data is the data selected by the selecting module 14 on the touchscreen of the first NFC device, the first sending module 11 is configured to send, before the selecting module 14 selects the to-be-transmitted data, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or the first sending module 11 is configured to send, when the selecting module 14 selects the to-be-transmitted data, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data.

Further, the NFC touch apparatus works in a card emulation mode, a reader/writer mode, or a peer to peer mode.

Figure 8:
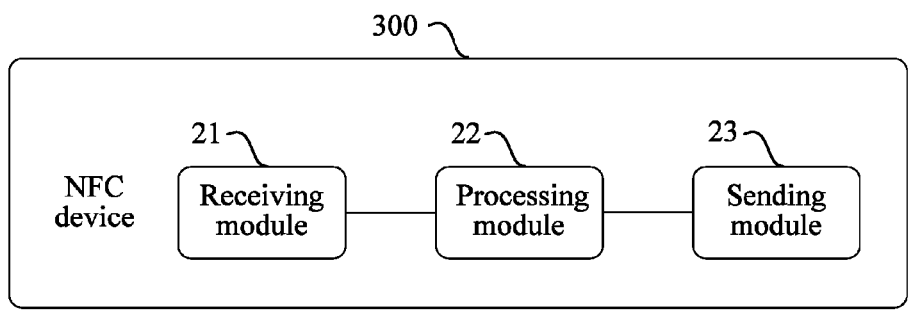
FIG. 8 is a schematic architectural diagram of Embodiment 1 of a near field communication NFC device according to the present disclosure.

FIG. 8 is a schematic architectural diagram of Embodiment 1 of a near field communication NFC device according to the present disclosure. A near field communication NFC device 300 provided in this embodiment includes a receiving module 21 configured to receive an intelligent extraction instruction sent by an NFC touch apparatus; a processing module 22 configured to intelligently extract, after the receiving module receives the intelligent extraction instruction, determined to-be-transmitted data to obtain intelligently extracted data; and a sending module 23 configured to send the intelligently extracted data to the NFC touch apparatus by means of NFC communication, so that the NFC touch apparatus sends the intelligently extracted data to a second NFC device after receiving the intelligently extracted data.

The NFC device provided in this embodiment of the present disclosure performs, according to an intelligent extraction instruction sent by an NFC touch apparatus, intelligent extraction processing on to-be-transmitted data determined by the NFC device, to obtain intelligently extracted data, then the intelligently extracted data is transmitted first from a first NFC device to the NFC touch apparatus and then from the NFC touch apparatus to a second NFC device, and finally, data transmission and information sharing between the first NFC device and the second NFC device are implemented. In the transmission process, because a size of the NFC touch apparatus is far smaller than sizes of the first NFC device and the second NFC device, an NFC antenna of the NFC touch apparatus and an NFC antenna of the first NFC device as well as an NFC antenna of the second NFC device are easily within an effective communication range, which effectively reduces a probability of unsuccessful communication caused because sizes of NFC devices may be different and a user may not know a specific area of an NFC antenna clearly, and avoids problems of poor user experience and an uncomfortable feeling that are brought by a back-to-back communication manner of two NFC devices. In addition, compared with a case in which two NFC devices directly perform data transmission in the prior art, the two NFC devices must approach each other, and data transmission can be performed only when the two are within an effective NFC communication range, while in this embodiment, by using the NFC touch apparatus, there is no time or distance limitation on data transmission between the first NFC device and the second NFC device any longer.

Figure 9:
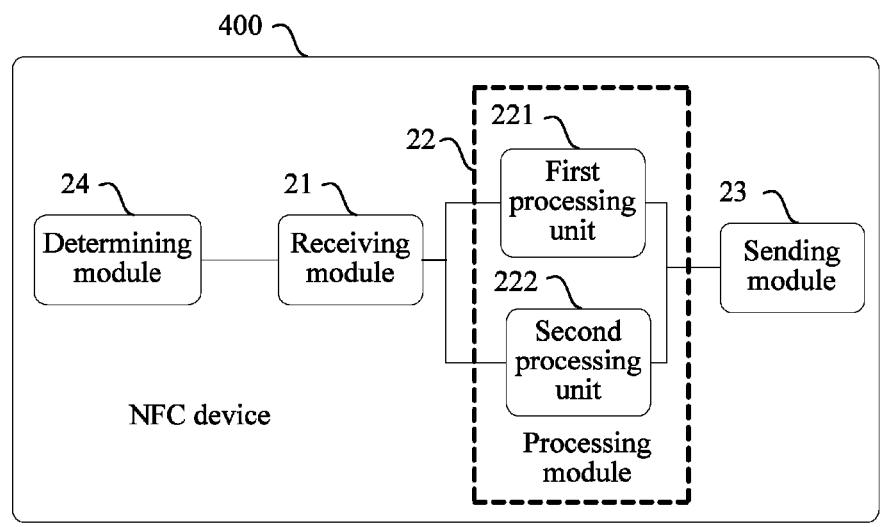
FIG. 9 is a schematic structural diagram of Embodiment 2 of an NFC device according to the present disclosure.

FIG. 9 is a schematic structural diagram of Embodiment 2 of an NFC device according to the present disclosure. As shown in FIG. 9, based on a structure of the apparatus in FIG. 8, an NFC device 400 in this embodiment further includes a determining module 24 configured to determine to-be-transmitted data, where the determined to-be-transmitted data includes data selected by the NFC touch apparatus on a touchscreen of the NFC device; or data currently displayed on a touchscreen of the NFC device.

Still referring to FIG. 9, further, the processing module 22 includes a first processing unit 221 configured to intelligently extract, after the intelligent extraction instruction is received, the to-be-transmitted data according to a type of the to-be-transmitted data to obtain the intelligently extracted data.

Further, the first processing unit 221 is configured to, if the type of the to-be-transmitted data is a resource file, extract wireless connection configuration information of the first NFC device to obtain the intelligently extracted data; or extract wireless connection configuration information of the NFC device and attribute information of the resource file to obtain the intelligently extracted data.

Further, the first processing unit 221 is configured to, if the type of the to-be-transmitted data is contact information, extract the contact information to obtain the intelligently extracted data; or extract the contact information and operation instruction information corresponding to the contact information to obtain the intelligently extracted data.

Further, the first processing unit 221 is configured to, if the type of the to-be-transmitted data is network information, extract at least one or a combination of website information of the network information, text information corresponding to the network information, and operation instruction information corresponding to the network information to obtain the intelligently extracted data.

Still referring to FIG. 9, further, the processing module 22 includes a second processing unit 222 configured to intelligently extract, after the intelligent extraction instruction is received, the to-be-transmitted data according to a size of the to-be-transmitted data to obtain the intelligently extracted data.

Further, the second processing unit 222 is configured to, if the size of the to-be-transmitted data is greater than or equal to a preset length threshold, extract wireless connection configuration information to obtain the intelligently extracted data; or extract wireless connection configuration information and attribute information of the resource file to obtain the intelligently extracted data.

Further, the second processing unit 222 is configured to, if the size of the to-be-transmitted data is less than a preset length threshold, extract the to-be-transmitted data to obtain intelligently extracted data; or extract the to-be-transmitted data and operation instruction information corresponding to the to-be-transmitted data to obtain the intelligently extracted data.

Further, the wireless connection configuration information includes BLUETOOTH configuration information and/or WiFi configuration information.

Figure 10:
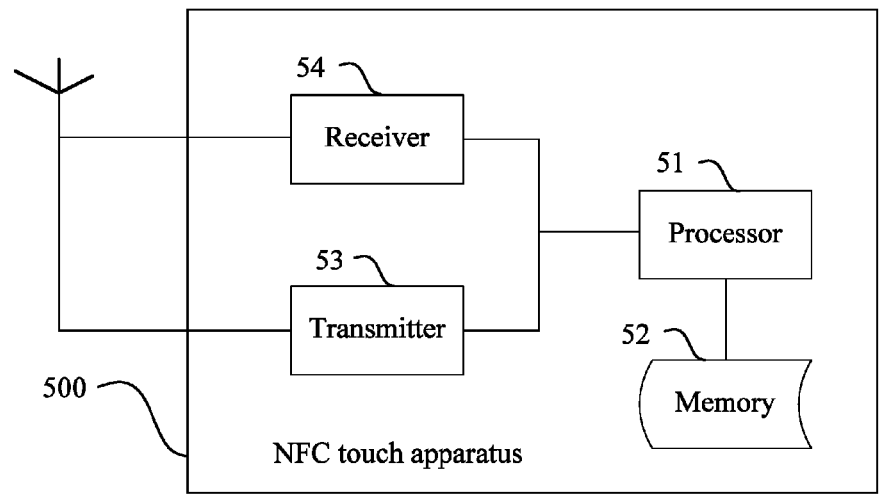
FIG. 10 is a schematic structural diagram of Embodiment 3 of an NFC touch apparatus according to the present disclosure.

FIG. 10 is a schematic structural diagram of Embodiment 3 of an NFC touch apparatus according to the present disclosure. As shown in FIG. 10, an NFC touch apparatus 500 provided in this embodiment includes a processor 51 and a memory 52. The NFC touch apparatus 500 may further include a transmitter 53 and a receiver 54. The transmitter 53 and the receiver 54 may be connected to the processor 51. The transmitter 53 is configured to send data or information, the receiver 54 is configured to receive data or information, and the memory 52 stores execution instructions. When the NFC touch apparatus 5 runs, the processor 51 communicates with the memory 52, and the processor 51 invokes the execution instructions in the memory 52, so as to perform the following operations sending, by the NFC touch apparatus, an intelligent extraction instruction to a first NFC device, to trigger the first NFC device to perform intelligent extraction processing on to-be-transmitted data determined by the first NFC device to obtain intelligently extracted data; receiving, by the NFC touch apparatus, the intelligently extracted data that is sent by the first NFC device by means of NFC communication; and sending, by the NFC touch apparatus, the intelligently extracted data to a second NFC device by means of NFC communication, where a size of the NFC touch apparatus is smaller than sizes of the first NFC device and the second NFC device.

Optionally, the to-be-transmitted data determined by the first NFC device includes data selected by the NFC touch apparatus on a touchscreen of the first NFC device; or data currently displayed on the first NFC device.

Optionally, the sending, by the NFC touch apparatus, an intelligent extraction instruction to a first NFC device, to trigger the first NFC device to perform intelligent extraction processing on to-be-transmitted data determined by the first NFC device to obtain intelligently extracted data includes sending, by the NFC touch apparatus, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or sending, by the NFC touch apparatus, the intelligent extraction instruction to the first NFC device by means of NFC communication, to trigger the first NFC device to perform intelligent extraction processing on the to-be-transmitted data determined by the first NFC device to obtain the intelligently extracted data.

Optionally, the sending, by the NFC touch apparatus, an intelligent extraction instruction to a first NFC device, to trigger the first NFC device to perform intelligent extraction processing on to-be-transmitted data determined by the first NFC device to obtain intelligently extracted data includes sending, by the NFC touch apparatus after the first NFC device determines the to-be-transmitted data and when the NFC touch apparatus and the first NFC device are not within an NFC communication range, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or sending, by the NFC touch apparatus after the first NFC device determines the to-be-transmitted data and when the NFC touch apparatus and the first NFC device are within an NFC communication range, the intelligent extraction instruction to the first NFC device by means of NFC communication, to trigger the first NFC device to perform intelligent extraction processing on the to-be-transmitted data determined by the first NFC device to obtain the intelligently extracted data.

Optionally, if the to-be-transmitted data determined by the first NFC device is the data selected by the NFC touch apparatus on the touchscreen of the first NFC device, the sending, by the NFC touch apparatus, an intelligent extraction instruction to a first NFC device, to trigger the first NFC device to perform intelligent extraction processing on to-be-transmitted data determined by the first NFC device to obtain intelligently extracted data includes sending, by the NFC touch apparatus before selecting the to-be-transmitted data, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data; or sending, by the NFC touch apparatus when selecting the to-be-transmitted data, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data.

Optionally, the NFC touch apparatus works in a card emulation mode, a reader/writer mode, or a peer to peer mode.

Figure 11:
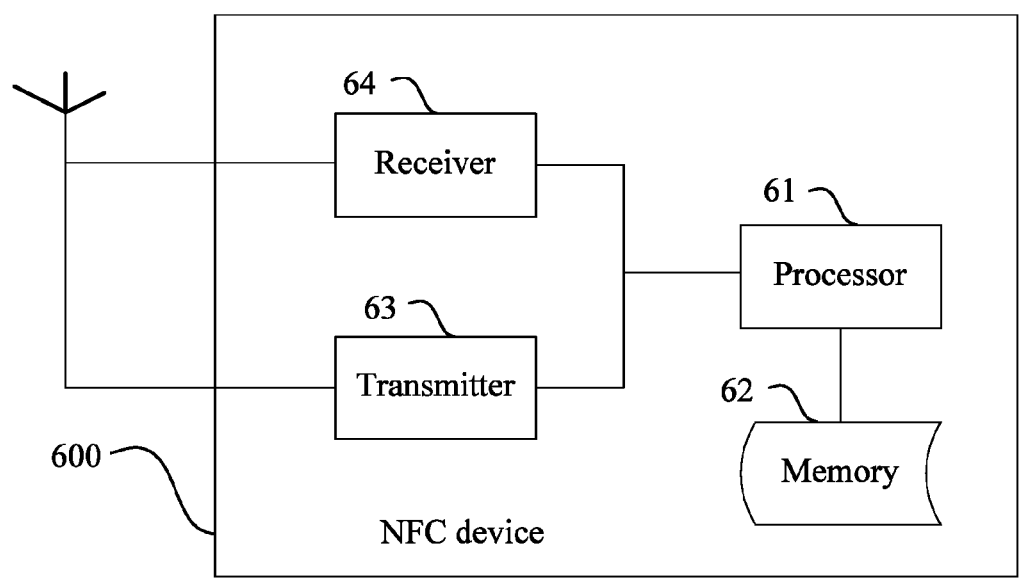
FIG. 11 is a schematic structural diagram of Embodiment 3 of a near field communication NFC device according to the present disclosure.

FIG. 11 is a schematic structural diagram of Embodiment 3 of a near field communication NFC device according to the present disclosure. As shown in FIG. 11, an NFC device 600 provided in this embodiment includes a processor 61 and a memory 62. The NFC device 600 may further include a transmitter 63 and a receiver 64. The transmitter 63 and the receiver 64 may be connected to the processor 61. The transmitter 63 is configured to send data or information, the receiver 64 is configured to receive data or information, and the memory 62 stores execution instructions. When the NFC device 600 runs, the processor 61 communicates with the memory 62, and the processor 61 invokes the execution instructions in the memory 62, so as to perform the following operations receiving an intelligent extraction instruction sent by an NFC touch apparatus; intelligently extracting, after receiving the intelligent extraction instruction, determined to-be-transmitted data to obtain intelligently extracted data; and sending the intelligently extracted data to the NFC touch apparatus by means of NFC communication, so that the NFC touch apparatus sends the intelligently extracted data to a second NFC device after receiving the intelligently extracted data.

Optionally, the intelligently extracting, after receiving the intelligent extraction instruction, determined to-be-transmitted data to obtain intelligently extracted data includes intelligently extracting, after receiving the intelligent extraction instruction, the to-be-transmitted data according to a type of the to-be-transmitted data to obtain the intelligently extracted data.

Optionally, the intelligently extracting, after receiving the intelligent extraction instruction, the to-be-transmitted data according to a type of the to-be-transmitted data to obtain the intelligently extracted data includes, if the type of the to-be-transmitted data is a resource file, extracting wireless connection configuration information of the first NFC device to obtain the intelligently extracted data; or extracting wireless connection configuration information and attribute information of the resource file to obtain the intelligently extracted data.

Optionally, the intelligently extracting, after receiving the intelligent extraction instruction, the to-be-transmitted data according to a type of the to-be-transmitted data to obtain the intelligently extracted data includes, if the type of the to-be-transmitted data is contact information, extracting the contact information to obtain the intelligently extracted data; or extracting, by the device, the contact information and operation instruction information corresponding to the contact information to obtain the intelligently extracted data.

Optionally, the intelligently extracting, after receiving the intelligent extraction instruction, the to-be-transmitted data according to a type of the to-be-transmitted data to obtain the intelligently extracted data includes, if the type of the to-be-transmitted data is network information, extracting at least one or a combination of website information of the network information, text information corresponding to the network information, and operation instruction information corresponding to the network information to obtain the intelligently extracted data.

Optionally, the intelligently extracting, after receiving the intelligent extraction instruction, determined to-be-transmitted data to obtain intelligently extracted data includes intelligently extracting, after receiving the intelligent extraction instruction, the to-be-transmitted data according to a size of the to-be-transmitted data to obtain the intelligently extracted data.

Optionally, the intelligently extracting, after receiving the intelligent extraction instruction, the to-be-transmitted data according to a size of the to-be-transmitted data to obtain the intelligently extracted data includes, if the size of the to-be-transmitted data is greater than or equal to a preset length threshold, extracting, by the first NFC device, wireless connection configuration information of the first NFC device to obtain the intelligently extracted data; or extracting wireless connection configuration information and attribute information of the resource file to obtain the intelligently extracted data.

Optionally, the intelligently extracting, after receiving the intelligent extraction instruction, the to-be-transmitted data according to a size of the to-be-transmitted data to obtain the intelligently extracted data includes, if the size of the to-be-transmitted data is less than a preset length threshold, extracting the to-be-transmitted data to obtain the intelligently extracted data; or extracting the to-be-transmitted data and operation instruction information corresponding to the to-be-transmitted data to obtain the intelligently extracted data.

Optionally, the wireless connection configuration information includes BLUETOOTH configuration information and/or WiFi configuration information.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disc, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A near field communication (NFC)-based data transmission method, comprising:
    sending, by an NFC touch apparatus, an intelligent extraction instruction to a first NFC device, to trigger the first NFC device to perform intelligent extraction processing on to-be-transmitted data determined by the first NFC device and according to a type of the to-be-transmitted data to obtain intelligently extracted data;
    receiving, by the NFC touch apparatus, the intelligently extracted data that is sent by the first NFC device by means of NFC communication; and
    sending, by the NFC touch apparatus, the intelligently extracted data to a second NFC device by means of NFC communication, wherein a size of the NFC touch apparatus is smaller than sizes of the first NFC device and the second NFC device.

2. The method according to claim 1, wherein the to-be-transmitted data determined by the first NFC device comprises data selected by the NFC touch apparatus on a touchscreen of the first NFC device.

3. The method according to claim 1, wherein sending, by the NFC touch apparatus, the intelligent extraction instruction to the first NFC device, to trigger the first NFC device to perform intelligent extraction processing on the to-be-transmitted data determined by the first NFC device to obtain the intelligently extracted data comprises sending, by the NFC touch apparatus, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data.

4. The method according to claim 1, wherein sending, by the NFC touch apparatus, the intelligent extraction instruction to the first NFC device, to trigger the first NFC device to perform intelligent extraction processing on the to-be-transmitted data determined by the first NFC device to obtain the intelligently extracted data comprises sending, by the NFC touch apparatus after the first NFC device determines the to-be-transmitted data and when the NFC touch apparatus and the first NFC device are within an NFC communication range, the intelligent extraction instruction to the first NFC device by means of NFC communication, to trigger the first NFC device to perform intelligent extraction processing on the to-be-transmitted data determined by the first NFC device to obtain the intelligently extracted data.

5. The method according to claim 2, wherein when the to-be-transmitted data determined by the first NFC device is the data selected by the NFC touch apparatus on the touchscreen of the first NFC device, sending, by the NFC touch apparatus, the intelligent extraction instruction to the first NFC device, to trigger the first NFC device to perform intelligent extraction processing on the to-be-transmitted data determined by the first NFC device to obtain the intelligently extracted data comprises sending, by the NFC touch apparatus when selecting the to-be-transmitted data, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data.

6. The method according to claim 1, wherein the NFC touch apparatus works in a card emulation mode, a reader/writer mode, or a peer to peer mode.

7. A near field communication (NFC) touch apparatus, comprising:
    a processor; and
    a memory coupled to the processor and storing programming instructions for execution by the processor, wherein the programming instructions instruct the processor to:
        send an intelligent extraction instruction to a first NFC device, to trigger the first NFC device to perform intelligent extraction processing on to-be-transmitted data determined by the first NFC device and according to a type of the to-be-transmitted data to obtain intelligently extracted data;
        receive the intelligently extracted data that is sent by the first NFC device by means of NFC communication; and
        send the intelligently extracted data to a second NFC device by means of NFC communication, wherein a size of the NFC touch apparatus is smaller than sizes of the first NFC device and the second NFC device.

8. The NFC touch apparatus according to claim 7, wherein the processor is further configured to send the intelligent extraction instruction to the first NFC device by using the touchscreen of the first NFC device, to trigger the first NFC device to perform intelligent extraction processing on the to-be-transmitted data determined by the first NFC device to obtain the intelligently extracted data.

9. The NFC touch apparatus according to claim 7, wherein the processor is further configured to send, after the first NFC device determines the to-be-transmitted data and when the NFC touch apparatus and the first NFC device are within an NFC communication range, the intelligent extraction instruction to the first NFC device by means of NFC communication, to trigger the first NFC device to perform intelligent extraction processing on the to-be-transmitted data determined by the first NFC device to obtain the intelligently extracted data.

10. A near field communication (NFC) touch apparatus, comprising:
    a computer processor configured to:
        send an intelligent extraction instruction to a first NFC device, to trigger the first NFC device to perform intelligent extraction processing on to-be-transmitted data determined by the first NFC device and according to a type of the to-be-transmitted data to obtain intelligently extracted data;
        receive the intelligently extracted data that is sent by the first NFC device by means of NFC communication; and
        send the intelligently extracted data to the second NFC device by means of NFC communication, wherein a size of the NFC touch apparatus is smaller than sizes of the first NFC device and the second NFC device.

11. The apparatus according to claim 10, wherein the to-be-transmitted data determined by the first NFC device comprises the to-be-transmitted data determined by the first NFC device comprises data currently displayed on the first NFC device.

12. The apparatus according to claim 10, wherein the computer processor is configured to send the intelligent extraction instruction to the first NFC device by means of NFC communication, to trigger the first NFC device to perform intelligent extraction processing on the to-be-transmitted data determined by the first NFC device to obtain the intelligently extracted data.

13. The apparatus according to claim 10, wherein the computer processor is configured to send, after the first NFC device determines the to-be-transmitted data and when the NFC touch apparatus and the first NFC device are not within an NFC communication range, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data.

14. The apparatus according to claim 11, wherein when the to-be-transmitted data is the data selected on the touchscreen of the first NFC device, the computer processor is configured to send, before the selecting the to-be-transmitted data, the intelligent extraction instruction to the first NFC device by using the touchscreen of the first NFC device, to trigger the first NFC device to perform intelligent extraction processing on the to-be-transmitted data determined by the first NFC device to obtain the intelligently extracted data.

15. The apparatus according to claim 10, wherein the NFC touch apparatus works in a card emulation mode, a reader/writer mode, or a peer to peer mode.

16. A near field communication (NFC) device, comprising:
a computer processor configured to:
receive an intelligent extraction instruction sent by an NFC touch apparatus;
intelligently extract, after receiving intelligent extraction instruction, determined to-be-transmitted data according to a type of the to-be-transmitted data to obtain the intelligently extracted data to obtain intelligently extracted; and
send the intelligently extracted data to the NFC touch apparatus by means of NFC communication such that the NFC touch apparatus sends the intelligently extracted data to a second NFC device after receiving the intelligently extracted data.

17. The device according to claim 16, wherein when the type of the to-be-transmitted data is a resource file, the computer processor is configured to extract wireless connection configuration information of the first NFC device to obtain the intelligently extracted data.

18. The device according to claim 16, wherein the computer processor is configured to intelligently extract, after the intelligent extraction instruction is received, the to-be-transmitted data according to a size of the to-be-transmitted data to obtain the intelligently extracted data.

19. The device according to claim 18, wherein when the size of the to-be-transmitted data is greater than or equal to a preset length threshold, the computer processor is configured to extract the wireless connection configuration information to obtain the intelligently extracted data.

* * * * *